United States Patent [19]
Korenic et al.

[11] Patent Number: 6,142,219
[45] Date of Patent: Nov. 7, 2000

[54] CLOSED CIRCUIT HEAT EXCHANGE SYSTEM AND METHOD WITH REDUCED WATER CONSUMPTION

[75] Inventors: Branislav Korenic, Columbia; Thomas P. Carter, Olney, both of Md.

[73] Assignee: Amstead Industries Incorporated, Chicago, Ill.

[21] Appl. No.: 09/265,505

[22] Filed: Mar. 8, 1999

[51] Int. Cl.[7] ............................................ F28B 1/00
[52] U.S. Cl. ..................... 165/110; 165/117; 165/900; 62/305; 62/310; 261/152; 261/153
[58] Field of Search ........................... 165/110, 900, 165/117; 62/305, 310; 261/152, 153

[56] References Cited

U.S. PATENT DOCUMENTS

| | | | |
|---|---|---|---|
| 2,247,514 | 7/1941 | Mart .................................... | 62/305 |
| 2,507,604 | 5/1950 | Lawson ................................ | 62/305 |
| 2,661,933 | 12/1953 | Deverall ............................. | 261/151 |
| 2,852,090 | 9/1958 | Kelley ................................. | 261/151 |
| 2,890,864 | 6/1959 | Stutz .................................... | 62/310 |

(List continued on next page.)

FOREIGN PATENT DOCUMENTS

| | | | |
|---|---|---|---|
| 712874 | 7/1965 | Canada ................................ | 62/310 |
| 1038636 | 9/1978 | Canada ................................ | 62/310 |
| 1149729 | 7/1983 | Canada ......................... | F28C 1/14 |

(List continued on next page.)

OTHER PUBLICATIONS

Niagara Blower Company, Sales Brochure Entitled "Wet Surface Air Coolers" p. 41 Ashrae Journal, Aug. 1979.

(List continued on next page.)

*Primary Examiner*—Ira S. Lazarus
*Assistant Examiner*—Terrell McKinnon
*Attorney, Agent, or Firm*—Edward J. Brosius; F. S. Gregorczyk; Stephen J. Manich

[57] ABSTRACT

A system and methods of extracting heat are disclosed. The system may be arranged as a fluid cooler or as a fluid condenser. Three heat exchange sections are provided: a dry indirect contact heat exchange section; a second indirect contact heat exchange section that is operable in either a wet or dry mode; and a direct contact heat exchange section. As a fluid cooler, a connecting flow path connects the dry indirect contact heat exchange section to the second indirect contact heat exchange section. A bypass flow path extends from the dry indirect contact heat exchange section to the process fluid outlet. A modulating valve is at the outlet so that process fluid can be selectively drawn from the dry indirect contact heat exchange section alone, from the second indirect contact heat exchange section in series with the dry indirect contact heat exchange section, or from both the dry and second indirect contact heat exchange sections and mixed, Separate air streams pass through the second indirect and direct contact heat exchange sections before entering the dry indirect contact heat exchange section. As a condenser, process fluid is directed to the dry indirect contact heat exchange section alone or to the dry and second indirect contact heat exchange sections in parallel by valves in the process fluid supply lines. In another embodiment, the process fluid flows in series from the dry to the second indirect contact heat exchange section. The system is operable in different modes to extract heat from the process fluid in the most efficient way with respect to annual water consumption. At low temperatures, the system operates dry with primary heat extraction performed by the dry indirect contact heat exchange section. At higher temperatures, the air streams may be adiabatically saturated with evaporative liquid to pre-cool them below the dry bulb temperature before entering the dry indirect contact heat exchange section. At still higher temperatures, the apparatus may be operated in a wet mode with the primary heat extraction performed by the second indirect contact heat exchange section. Heat is extracted from the process fluid while selectively distributing or not distributing the evaporative liquid over the second indirect contact heat exchange section. Plume formation is prevented since discharge air is heated in contact with the dry indirect contact heat exchange section before leaving the heat exchange apparatus.

45 Claims, 12 Drawing Sheets

U.S. PATENT DOCUMENTS

| | | | |
|---|---|---|---|
| 3,012,416 | 12/1961 | Dart | 62/305 |
| 3,141,308 | 7/1964 | Dart | 62/305 |
| 3,148,516 | 9/1964 | Kals | 62/305 |
| 3,365,909 | 1/1968 | Brainard | 62/305 |
| 3,747,362 | 7/1973 | Mercer | 62/171 |
| 3,820,353 | 6/1974 | Shiraishi et al. | 62/305 |
| 3,865,911 | 2/1975 | Lefevre | 261/140 |
| 3,923,935 | 12/1975 | Cates | 261/259 |
| 3,925,523 | 12/1975 | Cates | 261/DIG. 77 |
| 4,003,970 | 1/1977 | Vodicka | 261/159 |
| 4,076,771 | 2/1978 | Houx, Jr. et al. | 261/159 |
| 4,112,027 | 9/1978 | Cates | 261/111 |
| 4,119,140 | 10/1978 | Cates | 165/67 |
| 4,236,574 | 12/1980 | Bosne | 165/110 |
| 4,252,752 | 2/1981 | Flaundroy | 261/153 |
| 4,315,873 | 2/1982 | Smith | 261/158 |
| 4,367,183 | 1/1983 | Carbonaro | 261/159 |
| 4,379,485 | 4/1983 | Fisher, Jr. et al. | 165/110 |
| 4,476,065 | 10/1984 | McKey | 261/23 R |
| 4,683,101 | 7/1987 | Cates | 261/146 |
| 4,893,669 | 1/1990 | Kashiwada et al. | 165/38 |
| 4,974,422 | 12/1990 | Kocher | 62/305 |
| 5,078,205 | 1/1992 | Bodas et al. | 165/110 |
| 5,390,502 | 2/1995 | Storbeck et al. | 62/310 |
| 5,411,078 | 5/1995 | Ares | 62/305 |
| 5,435,382 | 7/1995 | Carter | 165/900 |
| 5,468,426 | 11/1995 | Kato | 261/153 |
| 5,724,828 | 3/1998 | Korenic | 62/305 |
| 5,816,318 | 10/1998 | Carter | 165/110 |

FOREIGN PATENT DOCUMENTS

| | | | |
|---|---|---|---|
| 0057801 | 8/1982 | European Pat. Off. | F28F 9/00 |
| 52-23749 | 2/1977 | Japan | F28C 1/00 |
| 53-40769 | 10/1978 | Japan | F28D 5/02 |
| 0254985 | 6/1990 | Japan | 165/900 |
| 5-25161 | 4/1993 | Japan | F28C 1/16 |

OTHER PUBLICATIONS

IMECO Incorporated, Sales Brochure Entitled "PF Evaporative Condensers"; no other information known (no date).

Rescorcon Incorporated, Sales Brochure Entitled "Wet Surface Air Coolers"; no other information known (no date).

"Parallel condensing combines best of all–wet, all–dry methods", Power, Jul./Aug. 1998, pp. 15–16.

Johnson Controls, Inc., Product/Technical Bulletin Entitled "VF Series Butterfly Valves 2 Through 20 in., Two–Way and Three–Way"; 1998; pp. 1–2.

Johnson Controls, Inc., Product/Technical Bulletin Entitled "System 350™ A350P Electronic Proportional Plus Integral Temperature Control"; 1996; pp. 1–2.

Johnson Controls, Inc., Product Sheet Entitled "SET189A Series Temperature Sensor"; insert date.

Super Radiator Coils, Product Bulletin Entitled "Bulletin 200 HW 291".

Super Radiator Coils, Product Bulletin Entitled "Bulletin 200 CW 1090—Type 5CW Water Cooling Coils".

Baltimore Aircoil Company, Sales Brochure Bulletin No. S384/1–ODA, Entitled "Low Profile Series VL". (No date).

Baltimore Aircoil Company, Sales Brochure Bulletin No. S408/1–FA, Entitled "Series V Industrial Fluid Coolers". (No date).

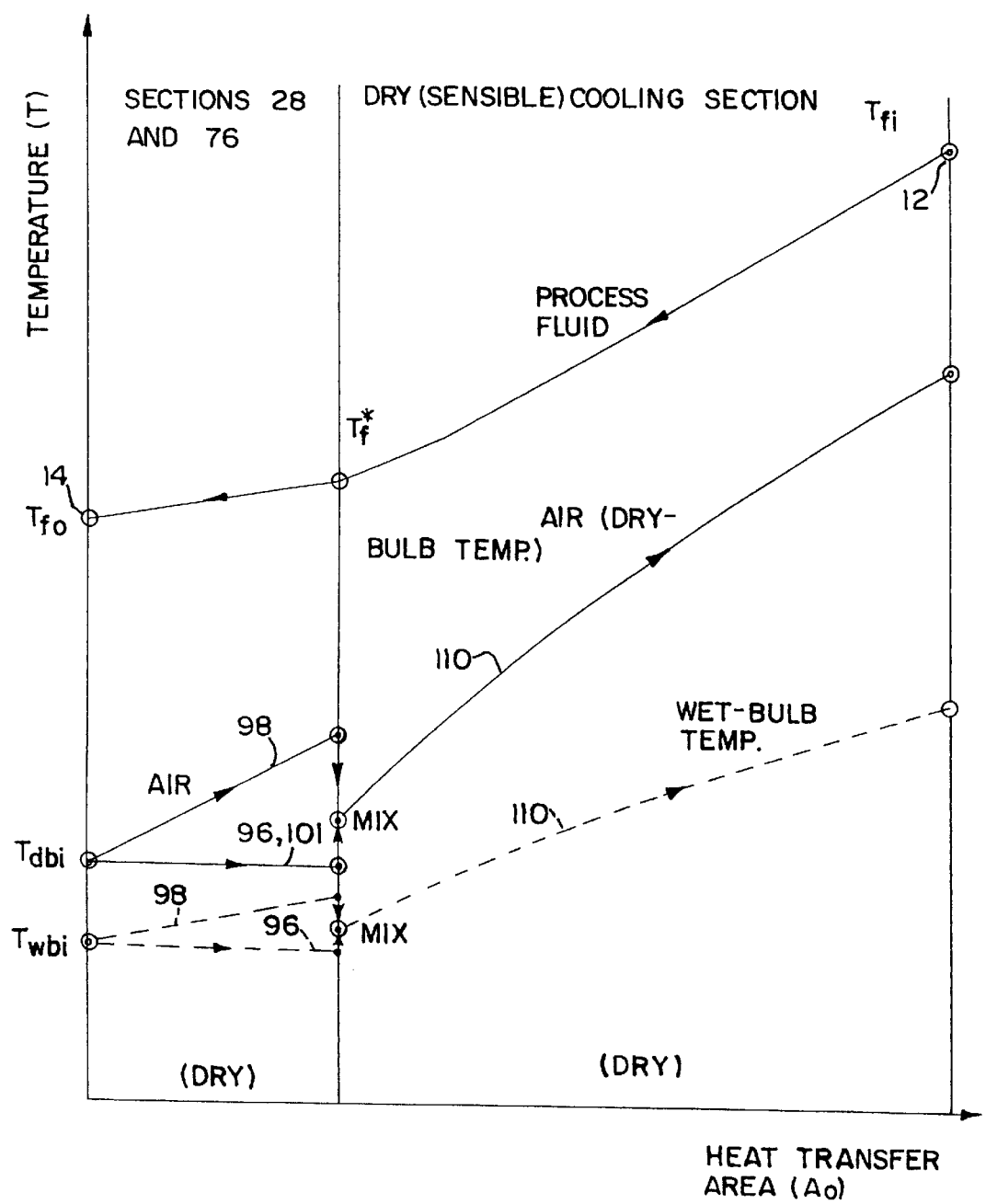

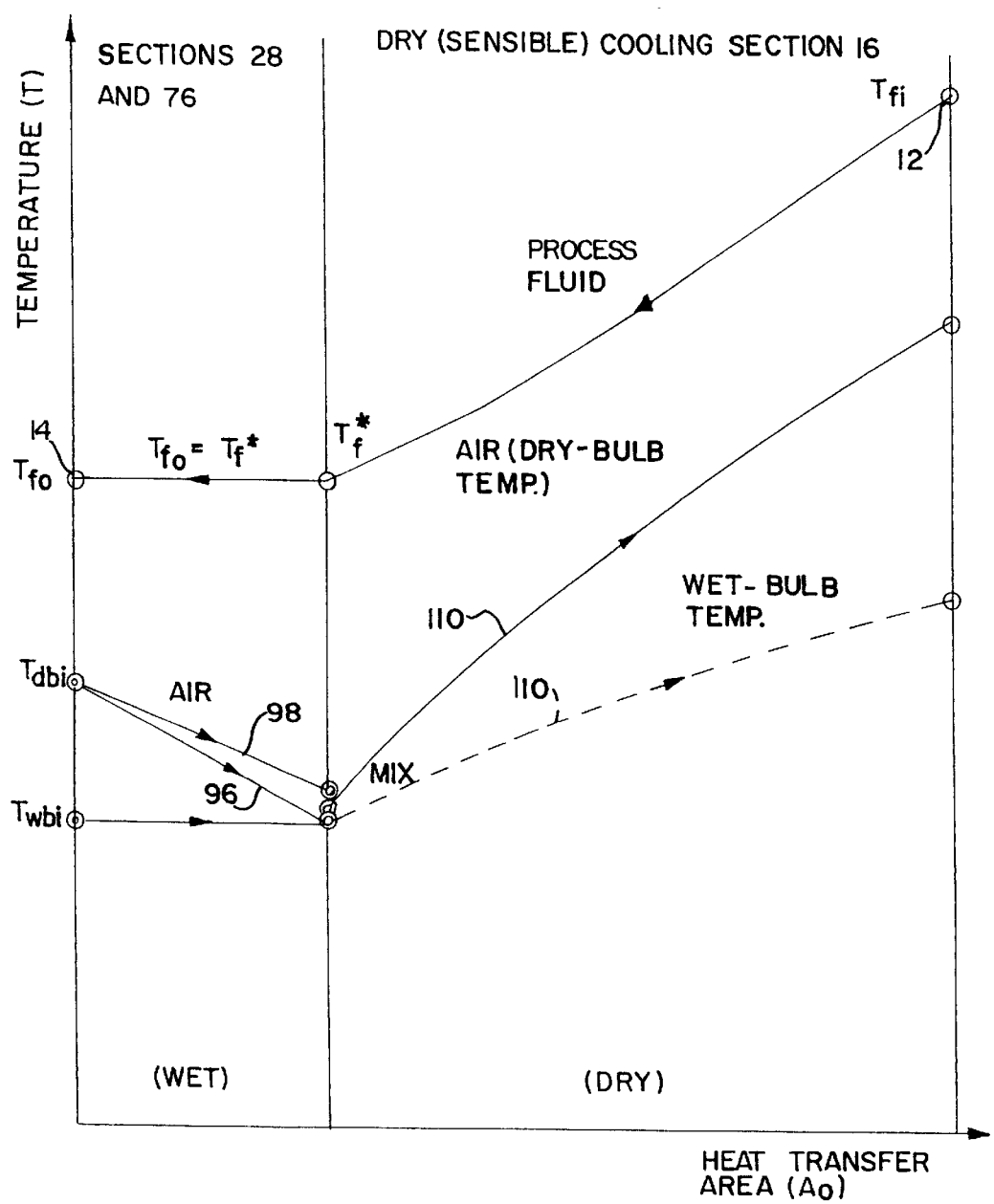

MODE 3 - MODULATION OF PROCESS FLUID FLOW

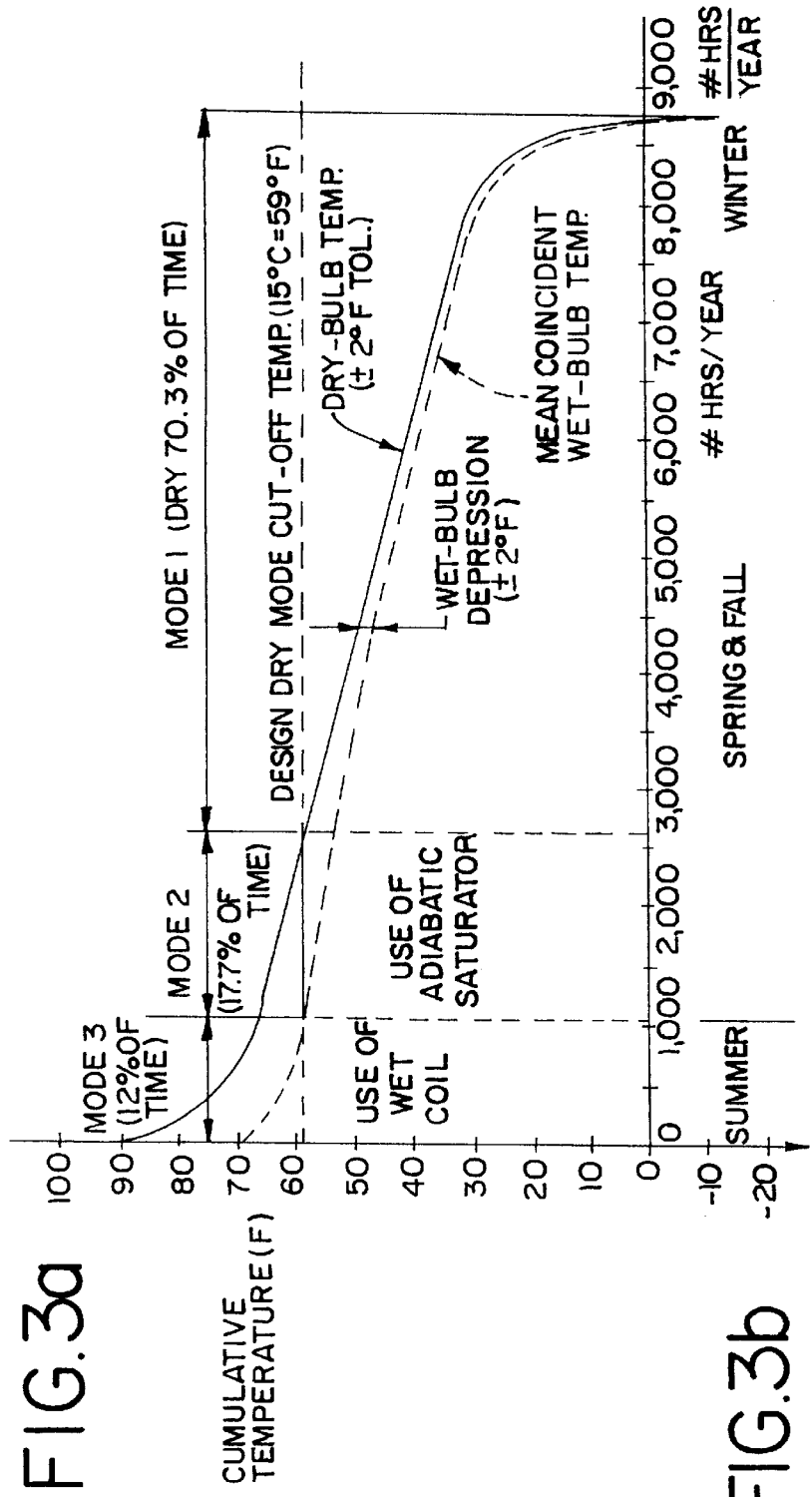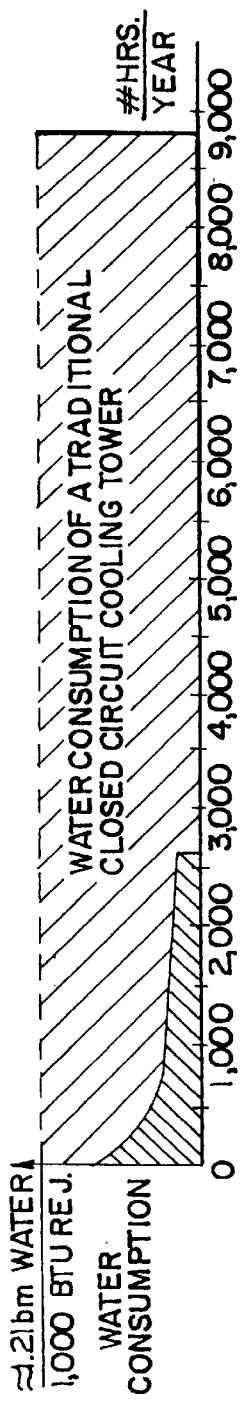
FIG.3a
FIG.3b

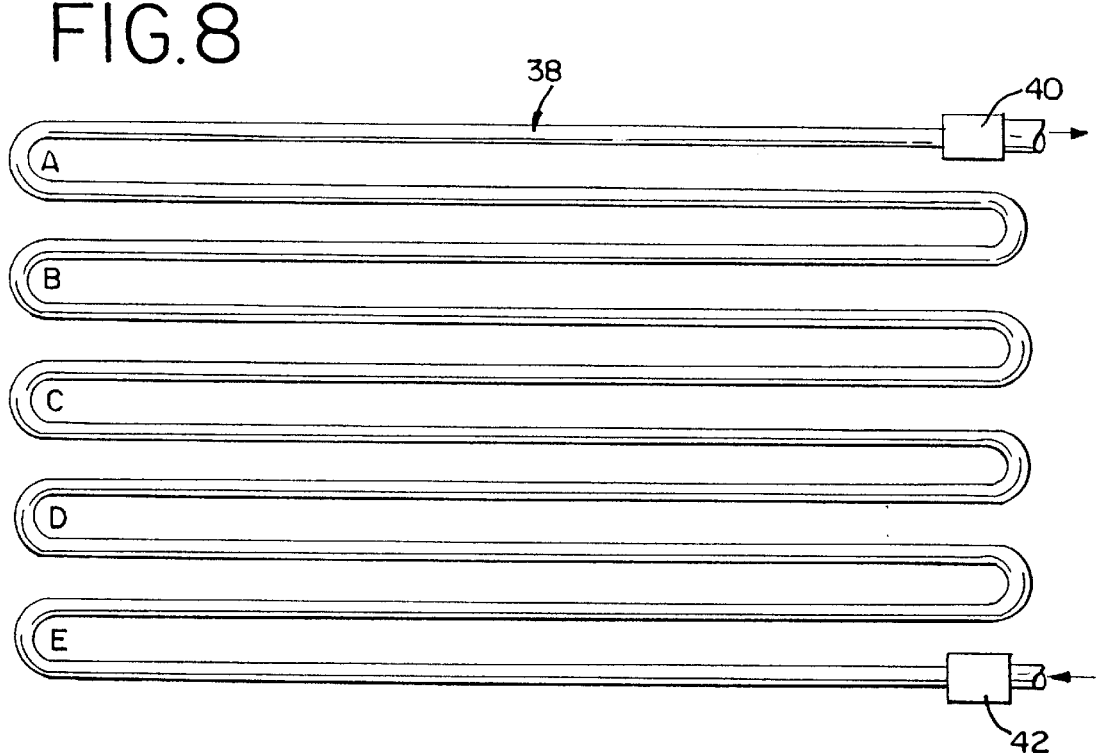
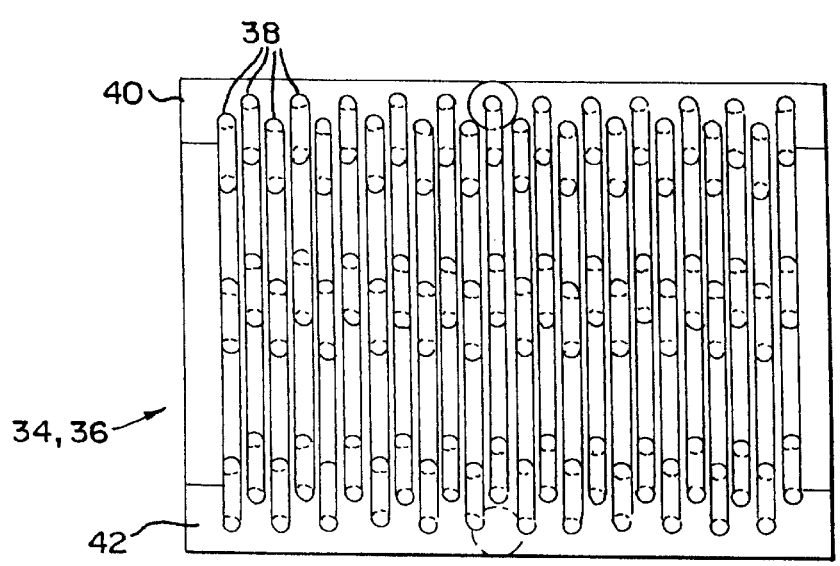

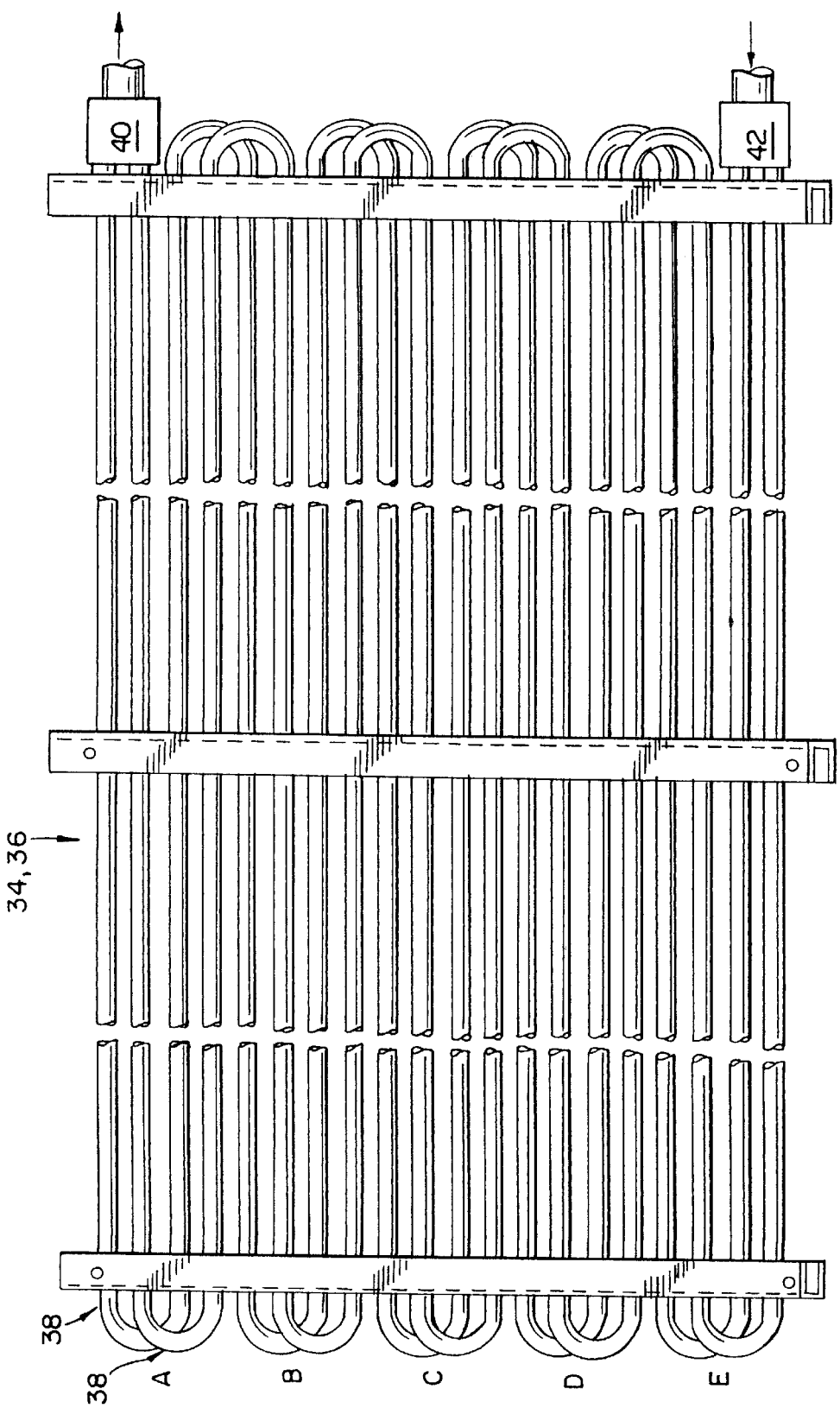

CLOSED CIRCUIT HEAT EXCHANGE SYSTEM AND METHOD WITH REDUCED WATER CONSUMPTION

BACKGROUND OF THE INVENTION

1. Field of the Invention

The present invention relates to heat exchangers, and more particularly to closed circuit evaporative heat exchangers and combined direct and indirect closed circuit evaporative heat exchangers.

2. Description of the Prior Art

Waste heat may be rejected to the atmosphere by dry or sensible heat exchangers. In a dry or sensible heat exchanger, there are two fluids: an air stream and a process fluid stream. In a closed system, the process fluid stream is enclosed so that there is no direct contact between the air stream and the process fluid stream; the process fluid stream is not open to the atmosphere. The enclosing structure may be a coil of tubes. Sensible heat is exchanged as the air stream is passed over the structure enclosing the process fluid stream. In the art these structures are known as "compact heat exchangers."

In most climates, evaporative heat exchangers offer significant process efficiency improvements over dry heat exchangers. One type of evaporative heat exchanger is a direct evaporative heat exchanger. In a direct heat exchanger, only an air stream and an evaporative liquid stream are involved; the evaporative liquid stream is usually water, and the two streams come into direct contact with each other.

Another type of evaporative heat exchanger is an indirect closed circuit evaporative heat exchanger, where three fluid streams are involved: an air stream, an evaporative liquid stream, and an enclosed process fluid stream. The enclosed fluid stream first exchanges sensible heat with the evaporative liquid through indirect heat transfer, since it does not directly contact the evaporative liquid and then the air stream and the evaporative liquid exchange heat and mass when they contact each other.

Another type of evaporative heat exchanger is a combined direct and indirect closed circuit evaporative heat exchanger. Examples of combined systems are disclosed in U.S. Pat. Nos. 5,435,382 (1995) and 5,816,318 (1998) to Carter.

Both dry and evaporative heat exchangers are commonly used to reject heat as coolers or condensers. Evaporative coolers reject heat at temperatures approaching the lower ambient wet bulb temperatures, while dry coolers are limited to approaching the higher ambient dry bulb temperatures. In many climates the ambient wet bulb temperature is often 20 to 30° F. below the ambient design dry bulb temperature. Thus, in an evaporative cooler, the evaporative liquid stream may reach a temperature significantly lower than the ambient dry bulb temperature, offering the opportunity to increase the efficiency of the cooling process and to lower the overall process energy requirements. Evaporative condensers offer similar possibilities for increased efficiency and lower energy requirements. In spite of these opportunities to increase process efficiencies and lower overall process energy requirements, evaporative cooling and evaporative condensing are often not used due to concern about water consumption from evaporation of the evaporative liquid and freezing potentials during cold weather operation.

In addition, both sensible and evaporative heat exchangers are typically sized to perform their required heat rejection duty at times of greatest thermal difficulty. This design condition is typically expressed as the summer design wet bulb or dry bulb temperature. While it is often critical that the heat rejection equipment be able to reject the required amount of heat at these design conditions, the duration of these elevated atmospheric temperatures may account for as little as 1% of the hours of operation of the equipment. The remainder of the time, the equipment may have more capacity than required, resulting in the waste of energy and evaporative liquid.

SUMMARY OF THE INVENTION

The present invention is directed toward heat extraction with the efficiencies of evaporative heat exchange while conserving evaporative liquid.

BRIEF DESCRIPTION OF THE DRAWINGS

In the following drawings, like reference numbers are used for like parts and:

FIG. 2a is a temperature profile in schematic showing the change in temperature of the process fluid and the air stream when the heat exchanger of the present invention is operated in a first dry mode;

FIG. 2b is a temperature profile in schematic showing the change in temperature of the process fluid and the air stream when the heat exchanger of the present invention is operated in a second mode with adiabatic saturation;

FIG. 3a is a typical yearly temperature profile for a selected city, showing both dry bulb and wet bulb temperatures and illustrating operation of the heat exchanger of the present invention in each of its modes of operation;

FIG. 3b is graph comparing the water consumption of a traditional closed circuit evaporative cooling tower with the expected water consumption of the present invention;

FIG. 8 is a front view of a single serpentine shaped circuit that may be used in the second indirect heat exchange section of the heat exchanger of the present invention;

FIG. 9 is a side view of the second indirect heat exchange section that may be used in the heat exchanger of the present invention;

FIG. 10 is a front view of the second indirect heat exchange section showing the staggered relationship between adjacent circuits and arrangement of the inlet and outlet headers;

DETAILED DESCRIPTION

Figure 1:
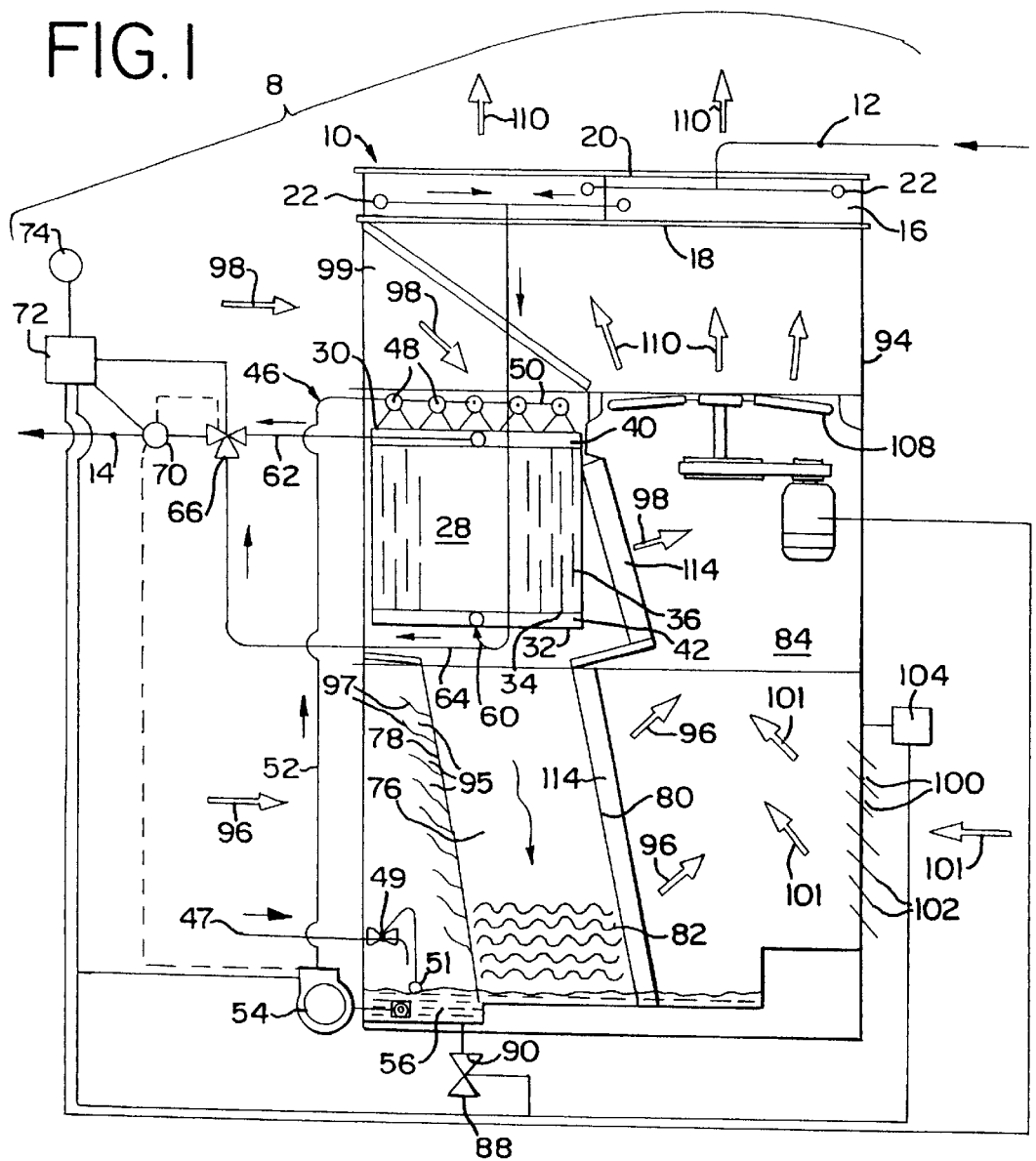
FIG. 1 is a side view of a closed circuit heat exchange system, with parts shown in schematic and with part of the heat exchange apparatus housing removed to illustrate the interior of the exchanger.

A first embodiment of a heat exchange system 8 is illustrated in FIG. 1. The system 8 includes a heat exchange apparatus 10 for extracting heat from a process fluid. The heat exchange system 8 includes a process fluid inlet 12, connected to receive process fluid from an external device (not shown) such as manufacturing process equipment. After heat is rejected from the process fluid in the heat exchange apparatus 10, the process fluid exits through a process fluid outlet 14.

Figure 11:
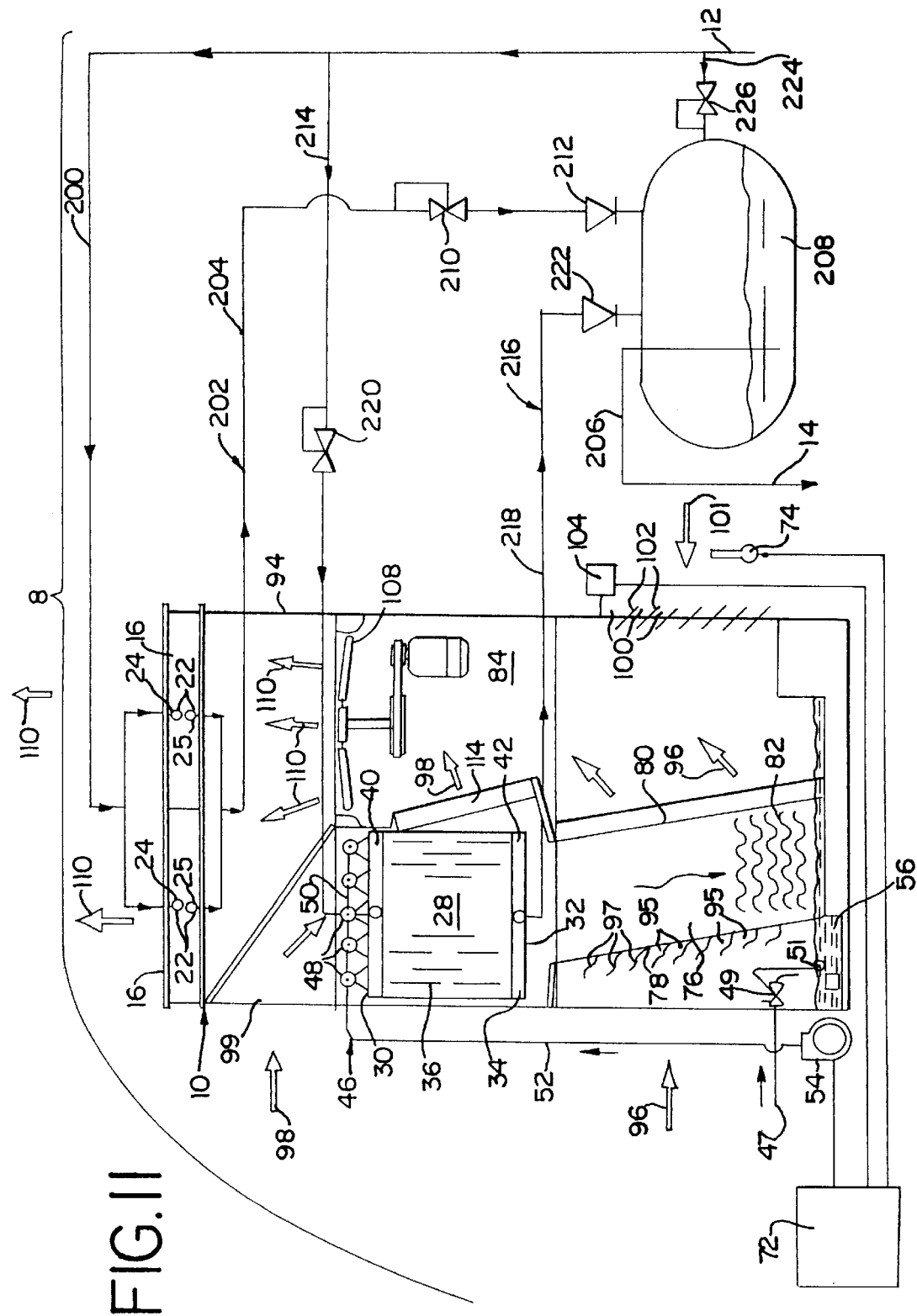
FIG. 11 is a side view of another embodiment of a closed circuit heat exchange system, with parts shown in schematic and with part of the heat exchange apparatus housing removed to illustrate the interior of the heat exchanger, illustrating the use of the principles of the present invention in a condenser.
Figure 12:
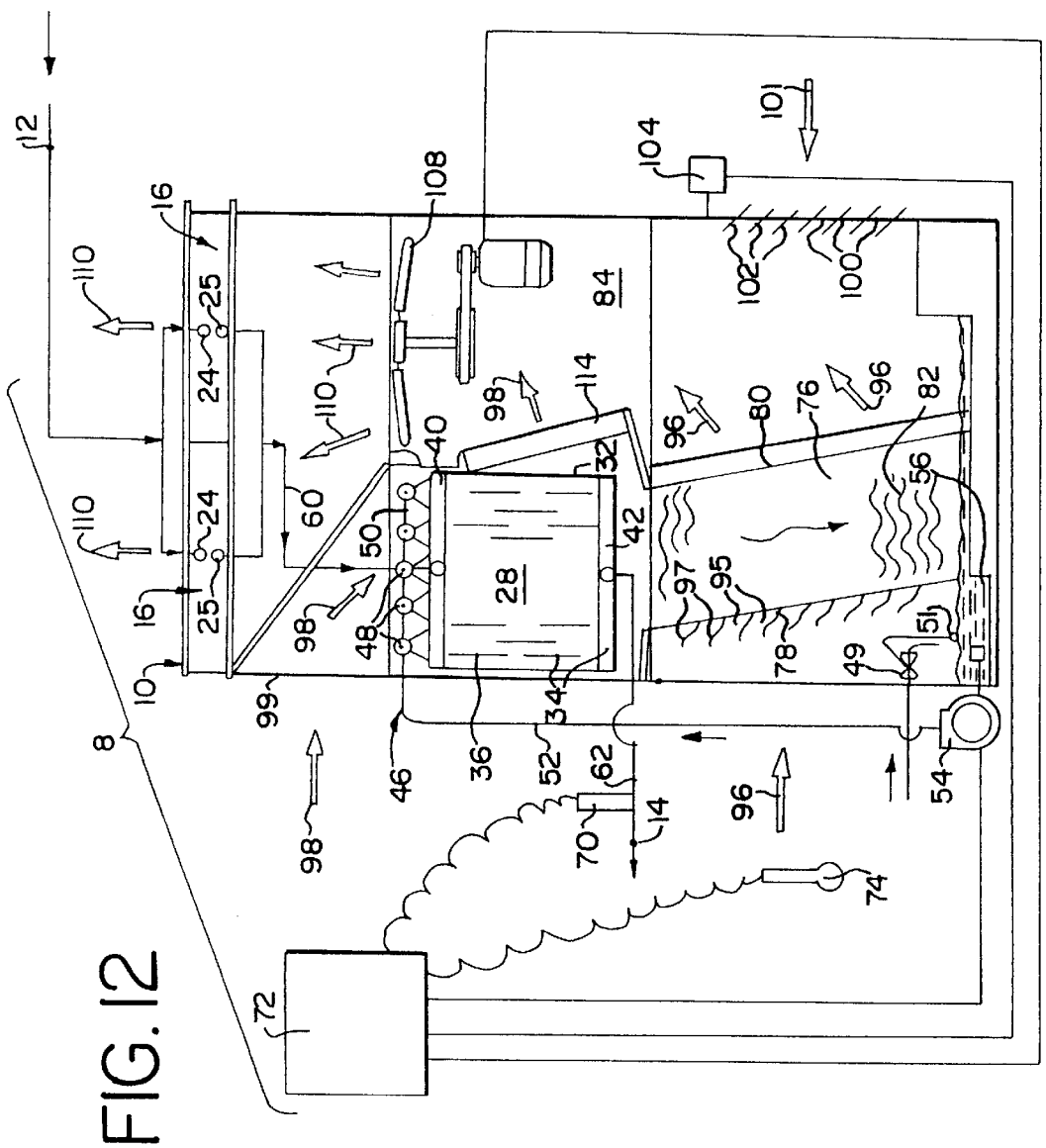
FIG. 12 is a side view of another embodiment of a closed circuit heat exchange system, with parts shown in schematic and with part of the heat exchange apparatus housing removed to illustrate the interior of the heat exchanger, illustrating another embodiment of a condenser.

The process fluid may comprise, for example, a single-phase liquid, such as water, that is received through the inlet 12 at one temperature and discharged through the outlet 14 at a lower temperature. Alternatively, the process fluid may comprise a single-phase gas that is received through the inlet 12 at one temperature and discharged through the outlet 14 at a lower temperature. Thus, the heat exchange system may comprise a fluid cooling system. A fluid cooling system is illustrated in FIGS. 1 and 4–6. The heat exchange system 8 may also comprise a condensing system, in which case the process fluid may comprise a two-phase or a multi-phase fluid at the inlet 12 that is discharged from the outlet 14 as a single phase liquid or a mixture of liquid and gas for a multi-phase fluid. A fluid condensing system is illustrated in FIGS. 11–12. It should be understood that these examples of process fluids are provided for purposes of illustration only, and that the invention is not limited to any particular type or phase of process fluid unless expressly set forth in the claims.

The illustrated heat exchange apparatus 10 is a closed circuit heat exchanger. The process fluid is enclosed between the inlet 12 and outlet 14 so that there is no exposure of the process fluid to the atmosphere, and no direct contact between the process fluid stream and any stream of air or evaporative liquid within the apparatus 10.

The heat exchange systems 8 of FIGS. 1, 4–6 and 11–12 illustrate various elements within the confines of the heat exchange apparatuses 10, and outside of the heat exchange apparatuses. It should be understood that the various elements of the system described hereinafter can be positioned within or outside the heat exchange apparatus unless otherwise described. As used herein and in the claims, the expression "heat exchange system" should be interpreted broadly to include both heat exchange apparatuses that enclose the features within the confines of the apparatus and heat exchange systems that include some of the elements within a heat exchange apparatus and some of the elements outside of the apparatus, and heat exchange systems that use more than one heat exchange apparatus; reference number 8 is used herein to refer to the heat exchange system, generally.

Figure 7:
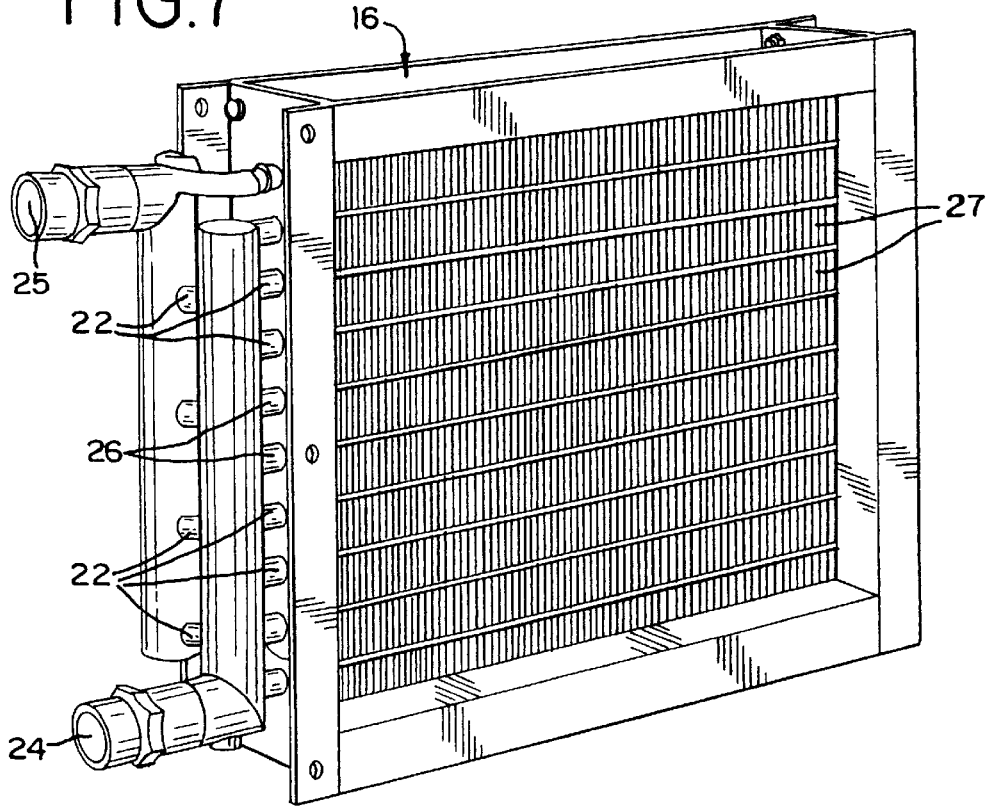
FIG. 7 is a perspective view of a dry indirect contact heat exchange device, or compact heat exchanger, that may be used in the closed circuit heat exchanger of the present invention.

The heat exchange system 8 of the FIG. 1 embodiment includes a dry indirect contact heat exchange section 16. This dry section 16 has an air inlet side 18, and air outlet side 20 and a process fluid circuit shown generally at 22 in FIG. 1. As shown in FIG. 7, the illustrated fluid circuit 22 includes an inlet header 24, outlet header 25, and a plurality of tubes 26, each tube having a plurality of fins 27 connected to the outside of the tube. The dry indirect contact heat exchange section 16 may comprise a commercially available externally finned heat transfer coil sold by Super Radiator Coils of Richmond, Va. as part 48×69-6R-5CW-L-R, with ⅝ in.×0.020 in. wall copper tubes and 0.008 in. aluminum fins (flat), with 24 circuits, illustrated in FIG. 7. It should be understood that this heat transfer coil is identified for purposes of illustration only, and the invention is not limited to this particular heat transfer coil. Two or more of such commercially available coils may be connected in series or in parallel to comprise the dry indirect contact heat exchange section 16. FIGS. 1 and 11–12 show two such coils in parallel arrangements. The combination of coils may vary with product size.

It should be understood that other externally finned structures could be used, such as tubes with external spiral wrapped fins, or any other combination classified as "compact heat exchangers"; the structure shown for the dry indirect heat exchange section is provided by way of example only. For heat exchange systems such as those shown in FIGS. 1 and 4, for example, it may be desirable to structure the dry heat exchange coils to optimize the pressure drop across the coils. For example, the face area of the dry heat exchange section may be optimized with the air flow to provide economical and efficient operation. Any suitable commercially available type of coil arrangement with external or internal fins or both could be used, such as coils with circular or corrugated fins, for example, as well as any other type of heat exchanger that operates in the dry mode, although the heat exchanger should be structured so that the pressure drop is not excessive. The external fins are expected to increase the efficiency of operation of the dry heat exchange section 16 at a minimum necessary air-side pressure drop.

To supplement the dry indirect contact heat exchange section 16, a second to indirect contact heat exchange section 28 is provided; this second section 28 is selectively operable for either dry or evaporative heat exchange. The second indirect contact heat exchange section 28 includes an air inlet side 30, an air outlet side 32, and a process fluid circuit 34. The process fluid circuit 34 of the illustrated second indirect contact heat exchange section 28 comprises a single coil assembly 36 of the type described and shown in U.S. Pat. No. 5,435,382. As shown in FIGS. 8–10, the coil assembly 36 has a generally rectangular shape with a series of horizontal closely spaced parallel circuits 38 of serpentine shape. All of the circuits 38 have a top end connected to a top fluid header 40 and a bottom end connected to a bottom fluid header 42. In the first illustrated embodiment, the bottom fluid header 42 comprises the inlet header and the top fluid header 40 comprises the outlet header when the heat exchange system is used as a fluid cooler. The inlet and outlet headers 42, 40 may be reversed if the heat exchange system is used as a condenser instead of as a fluid cooler, as illustrated in FIGS. 11–12. Together, the headers 40, 42 and serpentine circuits 38 comprise the process fluid circuit 34 of the second indirect contact heat exchange section 28.

As disclosed in U.S. Pat. Nos. 5,435,382 and 5,816,318 and shown in FIGS. 8–10, each individual circuit 38 within the coil assembly 36 consists of a single, continuous length of coil tubing that is subjected to a bending operation which forms the tubing into several U-shaped rows A–E, that are in a vertical and equally-spaced relationship from each other thereby providing each circuit 38 with a resultant serpentine shape.

The coil of the second indirect contact heat exchange section preferably has maximum dry and wet performance and a low fluid pressure drop. The second indirect contact heat exchange section 28 may comprise steel tubing in a steel framework, such as those used in the commercially-available Series 1500 Closed Circuit Cooling Towers and Series 1500 Evaporative Condensers available from Baltimore Aircoil Company of Baltimore, Md. It should be understood that other structures may be used for the second evaporative heat exchange section 28. For example, the tubes of the coils could be externally finned for more efficient heat transfer when operated in the dry mode, or the tubes may be internally finned with microfins or other similar arrangements known in the art.

As shown in FIG. 1, the heat exchange system 8 also includes a distribution system 46 for selectively distributing an evaporative liquid to the second indirect contact heat exchange section 28 for selective dry and evaporative heat exchange in the second evaporative heat exchange section. In the first illustrated embodiment, this distribution system 46 includes a plurality of spray nozzles 48 disposed above the second indirect contact heat exchange section 28. The spray nozzles 48 are connected to a distribution pipe system 50 disposed above the second indirect contact heat exchange section, which is connected to a vertical distribution pipe 52. The vertical distribution pipe 52 is connected to a pump 54 that is connected to draw evaporative liquid from a sump 56 positioned below the second indirect contact heat exchange section. Devices other than pumps may be used to move the evaporative liquid from the sump 54 to the spray nozzles 48, such as a venturi. It should be understood that the illustrated distribution system 46 is described for purposes of illustration only, and that the invention is not limited to the illustrated components unless the component is expressly set forth in one of the claims.

The distribution system 46 also includes a conduit 47, valve 49 or any other suitable device for introducing evaporative liquid to the apparatus; as shown in FIG. 1, in the illustrated embodiment the evaporative liquid is introduced into the sump 56. A sensor 51 could be placed in the sump 56 to determine whether the level of evaporative liquid falls below a pre-determined level, to activate a pump or open the valve 49 to replenish the supply of evaporative liquid. The evaporative liquid may be water.

Figure 1A:
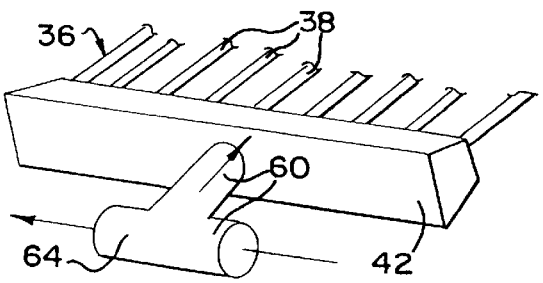
FIG. 1a is a enlarged perspective view of a portion of the second indirect contact heat exchange section showing the inlet flow path to the second indirect heat exchange section and the process fluid bypass flow path from the indirect heat exchange section.

The first illustrated heat exchange system 8 includes a process fluid connecting path 60 from the dry indirect contact heat exchange section process fluid circuit 22 to the second indirect contact heat exchange section process fluid circuit 34. In this embodiment, there are also a process fluid outlet flow path 62 from the second indirect contact heat exchange section 28 to the process fluid outlet 14, and a process fluid bypass flow path 64 from the dry indirect contact heat exchange section process fluid circuit 22 to the process fluid outlet 14. All of the flow paths 60, 62, 64 may comprise, for example, standard diameter pipes or conduits made of standard materials, such as steel pipe, galvanized on the outside, or stainless steel pipe. The connecting path 60 and bypass flow path 64 are shown in greater detail in FIG. 1a.

Figure 2C:
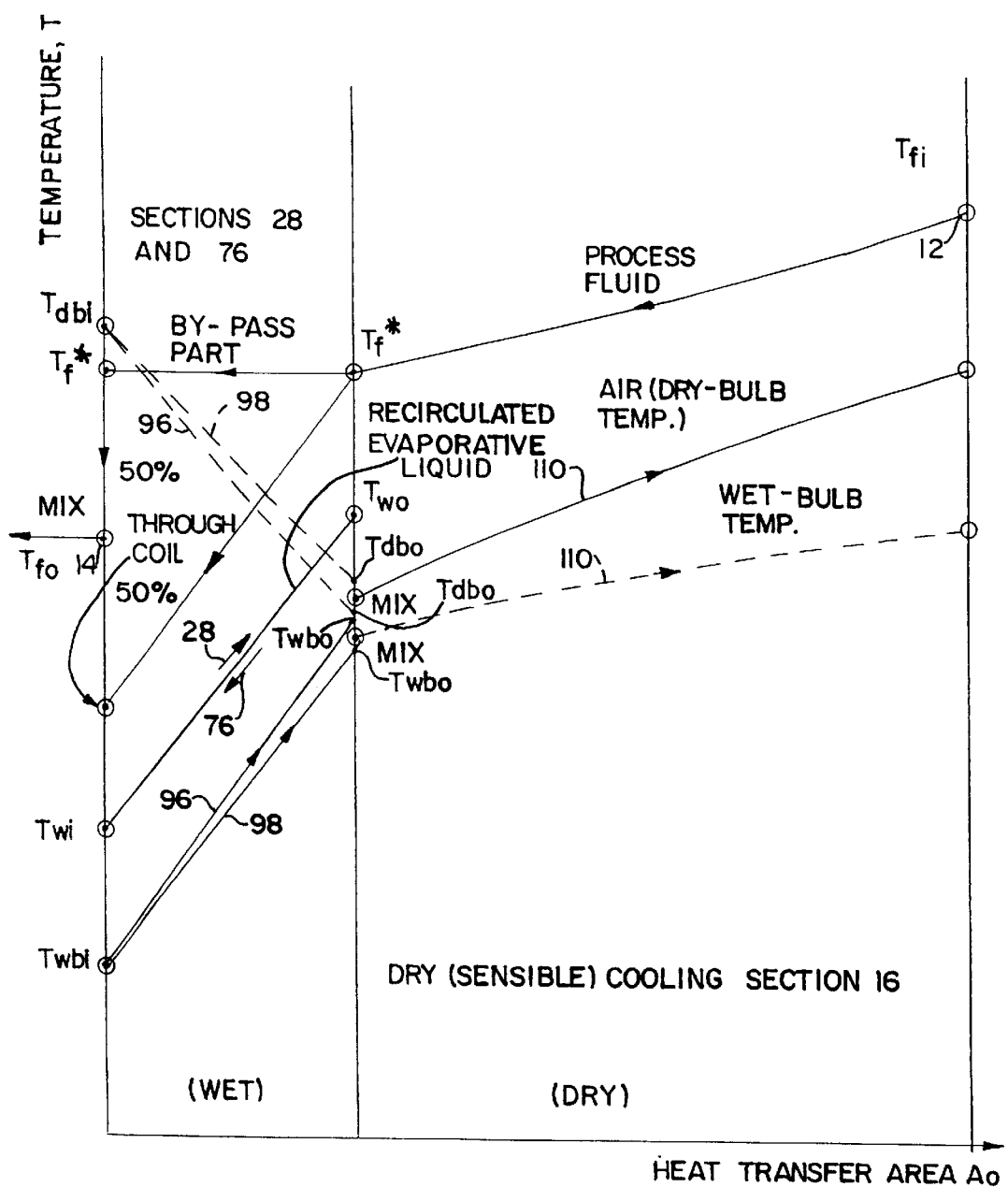
FIG. 2c is a temperature profile in schematic showing the change in temperature of the process fluid, air stream and evaporative liquid when the heat exchanger of the present invention is operated in a third mode with modulated process fluid flow.

A flow control mechanism 66 is also provided for controlling the flow of process fluid so that the process fluid exiting the process fluid outlet 14 may be selectively drawn from the dry indirect contact heat exchange section 16 and the second indirect contact heat exchange section 28 at some mixed temperature $T_{fo}$ (see FIGS. 2a–2c). The flow control mechanism 66 may allow for the process fluid to be drawn from the dry indirect contact heat exchange section 16 only, from the second indirect contact heat exchange section 28 in series with the dry indirect contact heat exchange section, or from both the dry and second indirect contact heat exchange sections 16, 28 simultaneously and mixed. The flow control mechanism 66 may comprise a three-way valve such as a modulating valve for example. The modulating valve may be placed to control the process fluid flow so that the process fluid exiting the dry indirect contact heat exchange section fluid circuit 22 either completely bypasses, partially bypasses or enters the fluid circuit of the second indirect contact heat exchange section 28. The modulating valve may comprise a servo valve, such as a three-way VF Series butterfly-type valve available from Johnson Controls, Inc. of Milwaukee, Wis., with an pneumatic or electrical actuator available from the same source.

Other flow control devices 66 may be used, and the present invention is not intended to be limited to any particular type of flow control device unless expressly set forth in the claims. For example, depending on the application, a manually operated three-way valve could be used, or various combinations of motorized and manually-operated valves could be used to achieve the result of selectively directing the process fluid through the dry and second indirect heat exchange sections 16, 28. Thus, the mechanism 66 for controlling the flow of process fluid so that the process fluid exiting the process fluid outlet may be selectively drawn from the dry indirect contact heat exchange section 16 and the second indirect contact heat exchange section 28 may comprise a manually-operated three-way valve, a plurality of motorized or manually-operated valves, a three-way modulating or mixing valve, or any other suitable device or combination of devices. The flow control device or devices 66 may be placed wherever desired to produce the desired effect, such as between the process fluid outlet 14 and the second indirect contact heat exchange section 28, or upstream of the second indirect contact heat exchange section 28 to control flow into the bypass flow path 64 and connecting flow path 60, as illustrated in FIG. 1. Suitable valves could also be combined with a common mixing tank that receives input from both the bypass flow path 64 and the outlet flow path 62, with a drain connected to the process fluid outlet 14. As described below with reference to the embodiments of FIGS. 11–12, valves could also be placed upstream of both of the indirect contact heat exchange sections 16, 28.

Preferably, during wet operation of the second indirect contact heat exchange section 28, the flow of process fluid through the second indirect contact heat exchange section 28 is minimized to minimize evaporative heat transfer and thereby minimize loss of evaporative liquid in evaporation. The flow control mechanism 66 preferably maximizes use of the dry indirect heat exchange section 16 to conserve evaporative liquid.

The heat exchange system 8 may also include a temperature sensor 70 connected to determine the temperature of the process fluid exiting the process fluid outlet 14. The temperature sensor 70 may be connected to control the operation of the flow control mechanism 66 in response to the temperature of the process fluid exiting the process fluid outlet 14, if the flow control mechanism 66 is an automated one. The temperature sensor 70 may comprise, for example, a SET189A Series Temperature Sensor, available from Johnson Controls, Inc. of Milwaukee, Wis., with necessary hardware for pipe mounting. It should be understood that this device is identified for purposes of illustration only, and that the invention is not limited to this device unless expressly set forth in the claims. Other similar temperature sensors from any other major controls manufacturer may be used as well. Alternatively, the flow control mechanism 66 could be manually operated based upon a temperature reading taken by an operator at the process fluid outlet 14, or could be manually controlled or automatically controlled based upon some other parameter. For example, it may be desirable in some situations to control the modulating valve 66 based on ambient weather conditions; a temperature sensor could be positioned to measure the ambient air temperature before entering one of the heat exchange sections, as discussed below with respect to FIGS. 11–12. A sensor could also be used to monitor another property of the process fluid, such as pressure, with the flow control mechanism 66 operating in response to the pressure of the process fluid. Automatic operation would be preferred for optimal performance.

The process fluid temperature sensor 70 may be connected directly to the flow control mechanism 66, to a programmable logic element incorporated into the flow control mechanism 66, as shown in the dashed line in FIG. 1 between the sensor 70 and control mechanism 66, to a plant computerized control system, or to a stand alone computer system. A programmable logic element 72 as part of the plant control system or as part of a stand alone computer system could also be used to control several servo-mechanisms. Any suitable programmable logic element 72 could be included as part of the system 8 to receive input from the temperature sensor 70 and control operation of the various motors, valves and pumps based upon the temperature readings. One example of a suitable programmable logic element is the System 350 A350P Electronic Proportional Plus Integral Temperature Control available from Johnson Controls, Inc. of Milwaukee, Wis. It is expected that a person skilled in the art of controller design, selection and implementation would be consulted for optimal results in selecting and implementing a suitable programmable logic element. Additional inputs 74 may be provided to the programmable logic element 72, such as input from an operator or from additional sensors such as temperature sensors set to determine the ambient air temperature or the temperature of the air stream entering the dry indirect contact heat exchange section 16, the second indirect contact heat exchange section 28 or the direct contact heat exchange section 76. Other types of sensors may be used to sense other physical properties of the process fluid. For example, as discussed below for the fluid condenser of FIGS. 11–12, pressure sensors may be used to determine the pressure of the process fluid, and the pressure readings could be input to the programmable logic element 72.

It may be desirable to include a motorized or manually operable valve (not shown) as part of the evaporative liquid distribution system 46. The valve could be used to control the volume, duration or rate of flow of evaporative liquid sprayed onto the coils of the second indirect heat exchange section 28. The valve could be connected to the programmable logic element 72 so that operation of the valve could be based upon the process fluid temperature or some other parameter. However, when operated in the wet mode, the flow of evaporative liquid should be kept within the range of flow recommended for the spray nozzles and sufficient for full coverage of the tube banks of the second indirect contact heat exchange section 28.

As seen in FIG. 1, the heat exchange system 8 may also include a direct contact heat exchange section 76 having an air inlet side 78, an air outlet side 80, and fill media 82. In the illustrated embodiment, the direct section 76, and the air inlet side 78 is positioned so that ambient air may be drawn into the apparatus 10, and the air outlet side 80 opens into a plenum 84. The plenum 84 also receives air from the outlet side 32 of the second indirect contact heat exchange section 28. The fill media 82 in the direct contact heat exchange section 76 may be any standard fill media, such as plastic fill, as well as wood or ceramic fill media, or any other fill media known in the art. For cross-flow, the fill media may be like that disclosed in U.S. Pat. No. 4,361,426 (1982) to Carter et al.; for counter flow, the fill media may be sheets shaped like trapezoids, as in U.S. Pat. No. 5,724,828 (1998) to Korenic. Commercially available cross flow PVC fill, such as "Accu-PAC CF 1900 Cooling Tower Film" fill available from Brentwood Industries of Reading, Pa., may be used. In the first illustrated embodiment of FIG. 1, the direct contact heat exchange section 76 is positioned to receive evaporative liquid from the second indirect contact heat exchange section 28; however, it should be understood that an evaporative liquid distribution system may be provided above the direct contact heat exchange section 76, so that evaporative liquid may be distributed to the direct section 76 without first passing through the second indirect contact heat exchange section 28.

The direct contact heat exchange section 76 serves as an adiabatic saturator and as an evaporative heat exchanger to cool the evaporative liquid, preferably with minimal use as an evaporative heat exchanger for conservation of the evaporative liquid. At most times of year, when the heat exchange system operates in the dry mode, the direct contact heat exchange section 76 is dormant.

The sump 56 is positioned below the direct contact heat exchange section 76. The heat exchange system 8 also includes a mechanism 54 for selectively moving evaporative liquid from the sump 56 to the spray outlets 48. The mechanism 54 may comprise a standard pump, controlled to operate at select times, as described below. The pump 54 may be connected to a temperature or pressure sensor for example, so that evaporative liquid is distributed to either the second indirect contact heat exchange section 28, the direct contact heat exchange section 76, or both, based upon a temperature or pressure reading. The temperature or pressure reading may be based on the temperature or pressure of the process fluid, such as the temperature or pressure of the process fluid downstream of the dry indirect contact heat exchange section 16, such as near the process fluid outlet 14. Thus, the evaporative liquid may be distributed or not distributed based on the temperature or pressure of the process fluid. A controller may be used for this purpose; the controller may simply comprise an on-off switch for the pump that is connected to receive input from the temperature or pressure sensor, or a more sophisticated controller may be used, such as one employing a programmable logic element. The controller may be part of the central programmable logic element 72 that is included as part of the system, utilizing temperature or pressure readings from the sensor 70, or the programmable controller could be part of the overall plant controls or part of a stand alone computer.

The sump 56 would typically include a drain 88 so that the evaporative liquid may be drained from the system to prevent freeze-up at certain times of year, such as during the winter months. The drain 88 may include a control mechanism 90 such as a solenoid valve controlled by a temperature sensor so that the drain 88 is opened when the ambient temperature falls below freezing, for example. As shown in FIG. 1, the valve 90 may be connected to be controlled by the central programmable logic element 72, or it could be manually operated or controlled based upon its own sensing system or device. A solenoid valve (not shown) could also be used to automatically drain the coils of either the dry indirect contact heat exchange section 16 or the second indirect contact heat exchange section 28 in the event that the process fluid temperature falls close to the freezing point.

There could be separate sumps and pumps for each of the second indirect and direct heat exchange sections. Each pump could be controlled to operate independently, as disclosed in the application for United States Patent filed concurrently herewith by Thomas P. Carter and Branislav Korenic and entitled "LOW PROFILE HEAT EXCHANGE SYSTEM AND METHOD WITH REDUCED WATER CONSUMPTION", the complete disclosure of which is incorporated by reference herein in its entirety. Alternatively, a single pump could be used with two separate spray systems and with a valve directing the evaporative liquid to either the spray nozzles of the second indirect contact heat exchange section or the direct heat exchange section. With separate sumps, the sump for the second indirect heat exchange section could be elevated above the direct heat exchange section or could be located below the direct heat exchange section.

Figure 4:
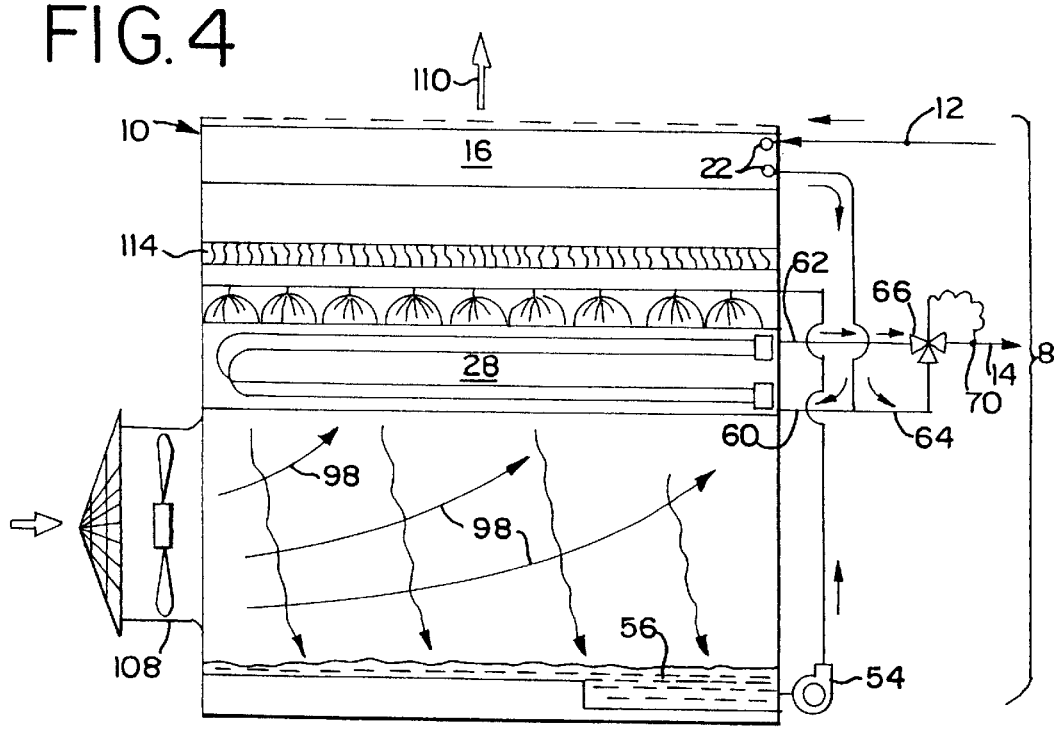
FIG. 4 is a side view of a second embodiment of a closed circuit heat exchange system, with parts shown in schematic and with part of the heat exchange apparatus housing removed to illustrate the interior of the heat exchanger.
Figure 5:
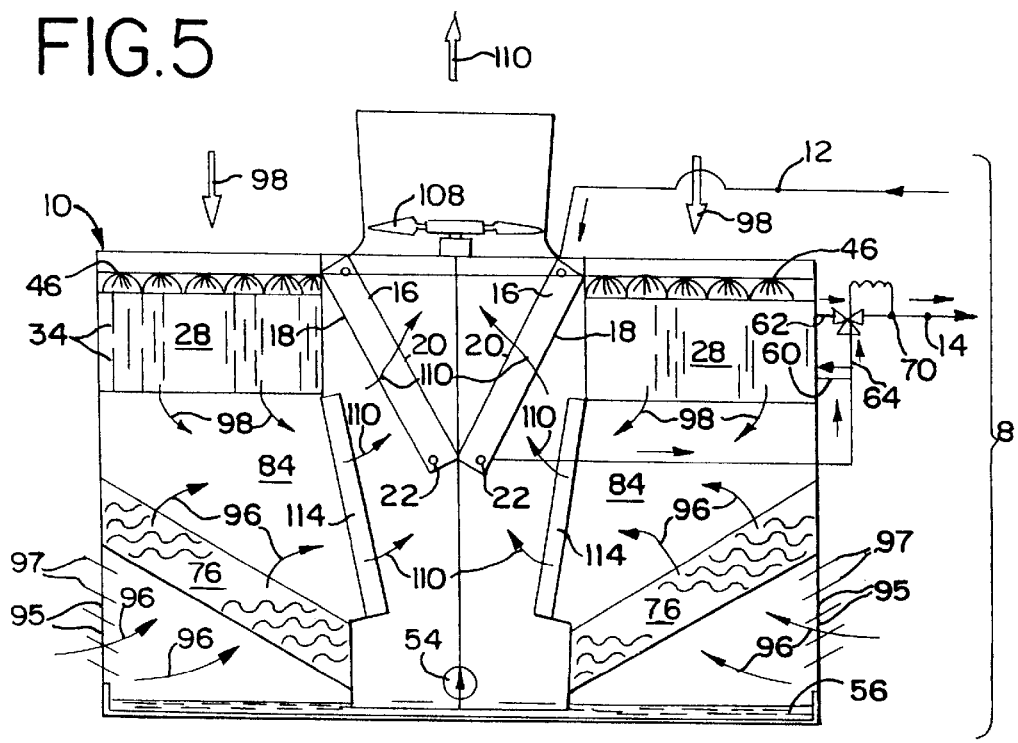
FIG. 5 is a side view of a third embodiment of a closed circuit heat exchange system, with parts shown in schematic and with part of the heat exchange apparatus housing removed to illustrate the interior of the heat exchanger.
Figure 6:
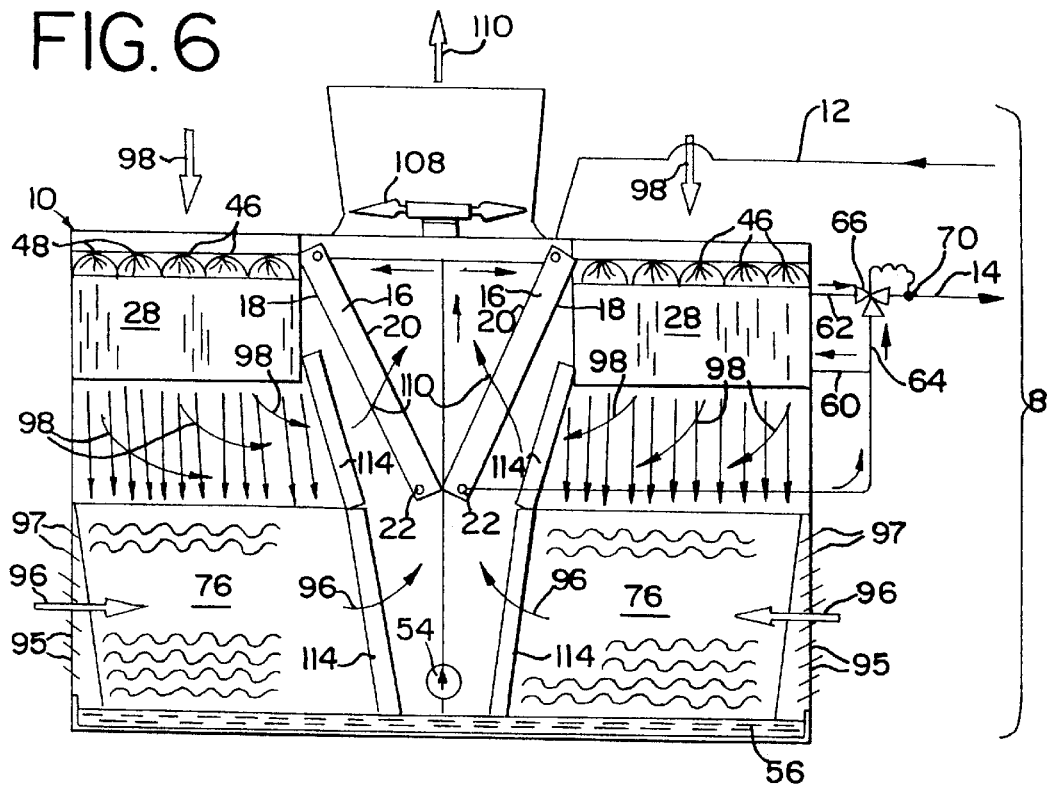
FIG. 6 is a side view of a fourth embodiment of a closed circuit heat exchange system, with parts shown in schematic and with part of the heat exchange apparatus housing removed to illustrate the interior of the heat exchanger.
Figure 13:
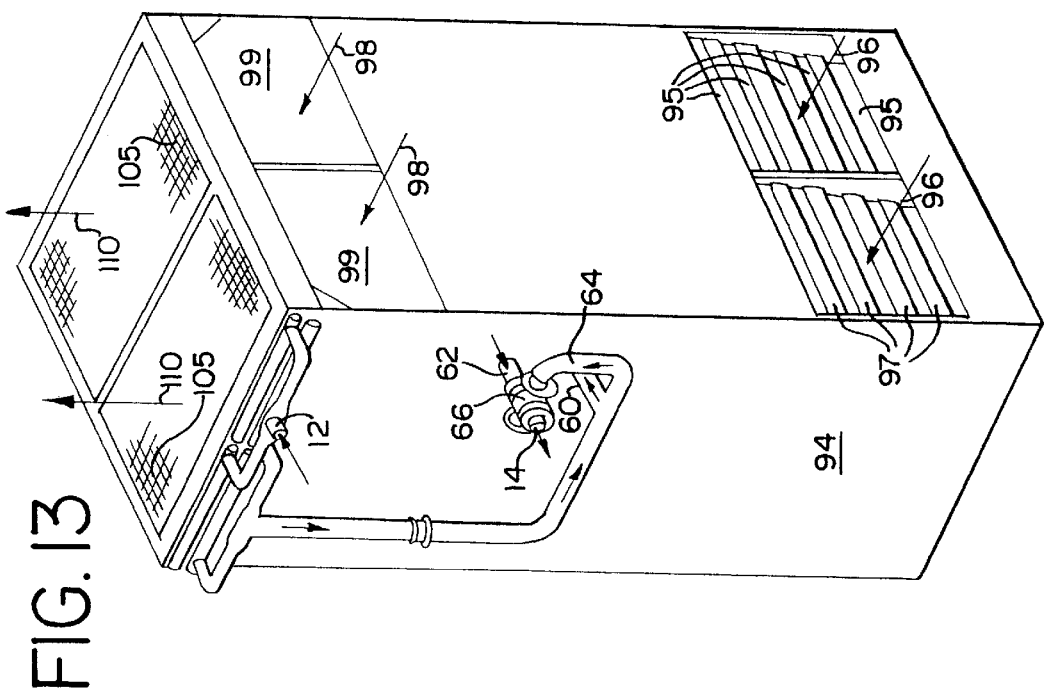
FIG. 13 is a schematic perspective view of the exterior of a heat exchanger incorporating the principles of the present invention.

The heat exchange system 8 also includes a housing 94 that substantially surrounds the dry indirect contact heat exchange section 16, the second indirect contact heat exchange section 28, the direct contact heat exchange section 76, the plenum 84 and the spray nozzles 48, all of these elements thereby being within the heat exchange apparatus 10. As shown in FIG. 13, the housing 94 has openings 95 corresponding with the direct contact heat exchange section air inlet side 78. Louvers 97 separate the openings 95. The illustrated openings 95 allow for a crosscurrent flow of air to enter through the air inlet side 78 of the direct contact heat exchange section 76, to exit the air outlet side 80 and to enter the plenum 84; the air stream through the direct contact heat exchange section 76 is shown at 96 in FIGS. 1 and 5–6. As shown in FIGS. 1 and 13, the housing 94 also has openings 99 above the second indirect contact heat exchange section 28 and leading to the air inlet side 30 of the second indirect contact heat exchange section 28. As shown in FIGS. 1 and 5–6, the air flow through the second indirect contact heat exchange section 28 may be concurrent with the flow of evaporative liquid, and exits the second indirect contact heat exchange section into the plenum 84; the air stream through the second indirect contact heat exchange section 28 is shown at 98 in FIGS. 1 and 4–6. It should be understood that the air inlet sides 30, 78 of both the second indirect and direct contact heat exchange sections 28, 76 may be otherwise positioned to provide for cross-flow or counter flow through the second indirect heat exchange section 28, or to allow for concurrent or counter flow through the direct contact heat exchange section 76. For example, as shown in FIG. 4, the air flow in the second indirect contact heat exchange sections 28 could be countercurrent to the evaporative liquid flow path. It should be understood that the present invention might be used with any of the devices described in U.S. Pat. No. 5,435,382 and U.S. Pat. No. 5,724,828, the complete disclosures of which are incorporated by reference herein in their entireties.

The air stream flowing through the dry indirect contact heat exchange section 16 is designated 110 in FIGS. 1, 4–6 and 11–14. The air stream 110 is a combination of the primary air stream 98 and secondary air stream 96. The apparatus 10 may have wire screens shown at 105 in FIGS. 13–14 at the air stream exit from the dry indirect contact heat exchange section.

As shown in FIGS. 1, 11–12 and 14, the heat exchange apparatus housing 94 also may include auxiliary air openings 100 into the plenum 84 upstream of the dry indirect contact heat exchange section air inlet 18. The auxiliary openings 100 provide an inlet for an ambient air stream 101 into the plenum 84 without first passing through either the second indirect contact heat exchange section 28 or direct contact heat exchange section 76. Dampers 102 may be provided for selectively closing the auxiliary air openings 100. The dampers 102 may be connected to one or more servo motors of any standard type, shown generally at 104 in FIG. 1, and the motors 104 may be connected to a control mechanism which may be the central logic element 72 or other control device so that the dampers 102 may be automatically opened and closed depending on, for example, the temperature of the process fluid downstream of the dry indirect contact heat exchange section 16, or some other factor. Generally, for fluid coolers, the dampers 102 should be closed when the heat exchange system is operating in the wet mode and open when the heat exchange system is operating in the dry mode. The dampers 102 need not be motorized but could be manually operable as well.

To move the air streams 96, 98, 101, 110 through the parts of the heat exchange apparatus 10, the present invention also includes an air moving device 108. The air moving device 108 moves ambient air into the second indirect contact heat exchanger section air inlet side 30 and moves ambient air into the direct contact heat exchange section air inlet side 78; in the embodiments of FIGS. 1, 5–6 and 11–12, the ambient air is drawn into the heat exchange sections by the air moving device 108. The air moving device 108 moves the air streams 98, 96 through the second indirect and direct contact heat exchange sections 28, 76 and out their air outlet sides 32, 80 into the plenum 84 where the two air streams 96, 98 are mixed to define the single combined air stream 110, designated 110 in FIG. 1, that enters and passes through the dry indirect contact heat exchange section 16. If the heat exchange apparatus has auxiliary air openings 100 as in FIG. 1, the air moving device 108 also selectively draws ambient air into the plenum 84 to be mixed into the combined air stream 110. In the first illustrated embodiment, the air moving device 108 is a motorized fan positioned within the apparatus housing 94 downstream of the plenum 84 and upstream of the dry indirect contact heat exchange section 16 to draw the air streams 98, 96 through the second indirect contact and direct contact sections 28, 76 and force the air stream 110 through the dry indirect contact heat exchange section 16. It should be understood that this device and position for the device are identified and illustrated for purposes of illustration only. It may be desirable to use other air-moving devices or systems positioned as shown or elsewhere, such as a forced draft fan of either the centrifugal or propeller type, disposed as illustrated in either of U.S. Pat. No. 5,724,828 or U.S. Pat. No. 5,435,382, for example. Other air-moving systems may also be used. The fan or other air-moving device may also be a variable speed device with a control mechanism for varying the speed of the fan. The control mechanism may be connected to receive input from the temperature sensor 70 or central logic element 72 connected for determining the temperature of the process fluid so that the speed of the fan may be varied in response to the process fluid temperature. For example, it may be desirable to conserve energy by operating the fan at lower speeds during the winter months when the process fluid may be cooled to a desired temperature range at a lower flow rate. It might also be desirable to provide a main air moving apparatus with an auxiliary air moving apparatus operable during times of increased demand.

The heat exchange apparatus 10 of FIG. 1 may be made by adding a standard commercially available dry indirect heat exchange section to a heat exchange apparatus of the type disclosed in U.S. Pat. No. 5,435,382 and commercially available from Baltimore Aircoil Company of Baltimore, Md., as the Series 1500 Closed Circuit Cooling Tower and Series 1500 Evaporative Condenser, and adding the process fluid connecting flow path 60, process fluid outlet flow path 62 and process fluid bypass fluid flow path 64, as well as the flow control mechanism 66. The temperature sensor 70 and programmable logic element 72 may also be added to the heat exchange apparatus as a retrofit. Alternatively, the heat exchange apparatus may be made independently.

Used as a single-phase fluid cooler, the heat exchange system of the present invention is operable in three modes. In Mode 1, at lower ambient temperatures, such as at temperatures below about 15° C., or about 59° F., hot process fluid to be cooled is supplied through the process fluid inlet 12 to the inlet header 24 of the dry indirect contact heat exchange section 16. From the inlet header 24, the process fluid distributes itself through the tubes 26 of the process fluid circuit 22 so that the process fluid flows at a substantially uniform flow rate within the entire series of circuits comprising one or more coil assemblies of the dry indirect contact heat exchange section 16. As the process fluid traverses the fluid circuit 22 of the dry indirect heat exchange section 16, the air-moving device 108 moves the stream 110 of air over the tubes 26 and fins 27 to cool the process fluid. The air stream 110 may comprise the primary air stream 98 that has passed through the second indirect heat exchange section 28 and the plenum 84 before entering the dry indirect heat exchange section, the secondary air stream 96 that has first passed through the direct contact heat exchange section 76 and plenum 84, the auxiliary stream of ambient air 101 that has passed through the auxiliary openings 100 and plenum 84, and mixtures of any of these streams 96, 98, 101. After the process fluid has cooled and is received in the outlet header 25, the entire process fluid stream enters the bypass flow path 64 and flows to the process fluid outlet 14 without entering the second indirect heat exchange section 28. The entire process fluid is directed to the bypass flow path 64 through operation of the flow control mechanism 66.

The temperature of the process fluid exiting from the apparatus or system may be monitored by the sensor 70, and if the temperature is higher than desired, the flow control mechanism 66 may be adjusted so that some or all of the process fluid enters the process fluid connecting flow path 60 and then enters into the second indirect contact heat exchange section 28 inlet header 42. From the second indirect contact heat exchange section inlet header 42, the process fluid may distribute itself through the serpentine fluid flow circuits 38 of the coil assembly 36 of the second indirect contact heat exchange section 28. As the process fluid traverses the fluid circuit 34 of the second indirect heat exchange section 28, the air-moving device 108 moves the primary stream of air 98 over the coil assembly 36 to cool the process fluid. In this first mode of operation, the second indirect contact heat exchange section 28 operates as a dry heat exchanger and the process fluid is further cooled by the stream of air 98 moving over the coil assembly 36. The process fluid is cooled mainly in the dry finned indirect contact heat exchange section 16 and partially in the dry second indirect contact heat exchange section 28. The dry second indirect contact heat exchange section could add about 6–15% cooling in this mode of operation. To reduce the system pressure drop from the non-active direct contact heat exchange section 76 and provide more air to the dry indirect contact heat exchange section 16, the motorized dampers 102 may be opened automatically to introduce an additional ambient air stream 101 through the auxiliary openings 100 into the plenum 84.

The effects of operation of the system in Mode 1 are graphically illustrated in the temperature profiles shown in FIG. 2*a*. As there shown, the process fluid enters the process fluid inlet 12 at an initial inlet temperature $T_{fi}$ and exits the process fluid outlet 14 at a lower final outlet temperature $T_{fo}$. If the process fluid bypasses the second indirect contact heat exchange section 28, the final outlet temperature $T_{fo}$ will equal the process fluid temperature at the dry indirect contact section 16 outlet, shown at temperature $T_{f^*}$ in FIG. 2*a*. If the process fluid enters the second indirect contact heat exchange section 28, the process fluid temperature will drop from the temperature $T_{f^*}$ to the temperature $T_{fo}$.

The primary air stream 98 enters the second indirect contact heat exchange section 28 at an initial dry bulb temperature, designated $T_{dbi}$ in FIGS. 2*a*–2*c*, and the secondary air stream also enters the direct contact heat exchange section 76 at the same initial dry bulb temperature $T_{dbi}$. The dry bulb temperature of the secondary air stream 96 remains relatively constant in the dry direct contact heat exchange section 76, as shown by the horizontal solid line in FIG. 2*a*. If no process fluid enters the second indirect heat exchange section 28, the temperature of the primary air stream 98 would also remain substantially constant, and would also follow the horizontal line in FIG. 2*a*. If process fluid flows through the coil assembly 36 of the second indirect heat exchange section 28, the dry bulb temperature of the primary air stream 98 increases as it travels through the second indirect contact heat exchange section 28, as shown by the upward sloping line, and enters the plenum 84. In the plenum 84, the air stream 98 mixes with the cooler air stream 96 received from the dry indirect contact heat exchange section 76. Thus, the air stream 110 entering the dry indirect contact heat exchange section 16 may be pre-cooled. The air stream 110 dry bulb temperature increases as the air stream 110 and process fluid exchange heat in the dry indirect contact heat exchange section 16. It should be understood that if the heat exchange apparatus is equipped with motorized dampers 102 and auxiliary openings 100, the dampers may be opened in this first mode of operation to introduce even a greater amount of ambient air at the lower dry bulb temperature to mix with the primary air stream 98 so that the air stream 110 enters the dry indirect contact heat exchange section 16 at a temperature even closer to $T_{dbi}$. Alternatively, to reduce pressure drop, the auxiliary air stream 101 could be substituted for the secondary air stream 96. FIG. 2a also shows the corresponding wet bulb temperatures of the air streams in the sections of the heat exchange system in dashed lines to indicate that in this mode of operation, the dry bulb temperatures of the air streams are the driving forces. The air stream, while being heated, remains at constant absolute air humidity.

It should be understood that in FIGS. 2a–2c, the relative areas of the heat exchange sections 16, 28, 76, along the horizontal axes, are not drawn to scale. The actual heat exchange area available in the dry indirect contact section 16 would be expected to be much larger relative to that shown for the second indirect contact heat exchange section 28. Moreover, the heat transfer area in the direct contact heat exchange section 76 would not be equal to the heat transfer area of the second indirect contact heat exchange section 28, as illustrated, but would be larger.

In the second mode of operation, the ambient air temperature is higher, for example, in excess of about 15° C. or 59° F., and either or both the second indirect contact heat exchange section 28 and the direct contact heat exchange section 76 operate to adiabatically saturate their respective air streams 98, 96 before the air streams enter the plenum 84. In this mode, the evaporative liquid distribution system 46 is activated so that evaporative liquid, usually water, is sprayed over the second indirect heat exchange section 28, or the direct contact heat exchange section 76, or both, depending on the structure of the distribution system.

In the embodiment of FIG. 1, in the second mode of operation, the evaporative liquid is sprayed over the coil assembly 36 of the second indirect contact heat exchange section 28 and drips downward to the fill media 82 in the direct contact heat exchange section 76 and then to the sump 56. From the sump 56, the evaporative liquid is pumped and recirculated through the distribution system. In this mode of operation, the temperature of the evaporative liquid equals the initial wet bulb temperature of the ambient air stream, shown at $T_{wbi}$, and remains constant. As shown in FIG. 2b, the flow control mechanism 66 is adjusted to completely open the bypass fluid flow path 64, so that no process fluid flows through the second indirect contact heat exchange section 28.

When no process fluid flows through the second indirect contact heat exchange section 28, the evaporative liquid will circulate through the second indirect contact heat exchange section 28 and the direct contact heat exchange section 76 with no heat load from the process fluid. Instead, the circulation of the evaporative liquid will saturate the primary and secondary air streams 98, 96 in the respective second indirect and direct contact heat exchange sections 28, 76.

As the air streams 98, 96 are saturated, the temperatures of the air streams in the second indirect and direct contact heat exchange sections 28, 76 will drop from the initial dry bulb temperature $T_{dbi}$ toward the lower wet bulb temperature $T_{wbi}$. The absolute humidity of the air streams 96, 98 increases as they saturate along the wet bulb temperature $T_{wbi}$. The primary air stream 98 will probably not achieve 100% saturation, as shown by the solid line at 98 in FIG. 2b, and its temperature will be above the wet bulb temperature. But since there may be a more dense media in the direct contact heat exchange section 76, the temperature of the secondary air stream 96 may reach or more closely approximate the wet bulb temperature $T_{wbi}$, as shown by the steeper line at 96 in FIG. 2b.

The adiabatically cooled air streams 98, 96 are moved by the 108 fan into the plenum 84. The two air streams 96, 98 will mix in the plenum, and the temperature of the combined air stream will lie between the temperatures of the primary and secondary air streams 98, 96, as shown at "mix" in FIG. 2b. The mix temperature will probably be closer to the temperature of the secondary air stream 96 since the volumes of the air streams will probably not be equal. From the plenum 84, the combined air stream 110 will be moved over the fins 27 and tubes 26 of the dry indirect contact heat exchange section 16.

The dry bulb temperature of the combined air stream 110 will be the operative factor in the dry indirect contact heat exchange section 16, as indicated by the solid line in FIG. 2b. The dry bulb and wet bulb temperatures of the combined air stream 110 will increase in the dry indirect contact heat exchange section 16, as shown in FIG. 2b, while the absolute humidity will remain constant. The motorized dampers 102 should be closed so that the warmer ambient dry air stream 101 is blocked from entering the plenum 84 through the auxiliary openings 100.

Since the evaporative liquid substantially saturates the primary and secondary air streams, all of the air entering the dry indirect contact heat exchange section 16 is pre-cooled below the ambient dry bulb temperature $T_{dbi}$, and cooling in the dry indirect contact heat exchange section 16 is enhanced. And since the evaporative liquid carries no heat load from the process fluid, loss of evaporative liquid through evaporation is minimized to conserve the evaporative liquid.

As shown in FIG. 2b, the process fluid is cooled in the dry indirect contact heat exchange section 16 from an initial inlet temperature $T_{fi}$ to a temperature $T_{f*}$. Since no process fluid flows through the second indirect contact heat exchange section 28, the process fluid outlet temperature $T_{fo}$ will be substantially equal to the temperature $T_{f*}$.

When the ambient air temperature further increases, or when the outlet temperature of the process fluid exceeds a set point, the heat exchange system may be operated in Mode 3. The temperature profile of operation in this third mode is shown in FIG. 2c. In this mode, the flow control mechanism 66 operates to modulate the process fluid flow, so that some or all of the process fluid enters the process fluid connecting flow path 60 and flows to and through the process fluid circuit 34 of the second indirect contact heat exchange section 28. The flow control mechanism 66 may be operated manually or automatically so that the process fluid is selectively drawn from both the dry and second indirect contact heat exchange sections 16, 28 and mixed. When the outside or ambient temperature is relatively low, that is, near the Mode 2 temperature range, a small amount of process fluid will enter the second indirect heat exchange section process fluid circuit 34 through the connecting flow path 60. Consequently, the thermal process will only deviate slightly from the adiabatic saturation process of Mode 2, and the temperature of the evaporative liquid will be slightly higher than the cooling limit (the entering air wet bulb temperature). As will be understood by those skilled in the art, the temperatures of the air streams 98, 96 exiting the second indirect and direct contact heat exchange section air outlet sides 32, 80 will be somewhat increased, and the consumption of evaporative liquid will also increase slightly. At this temperature range, the second indirect contact heat exchange section 28 assists the dry indirect contact heat exchange section 16 to cool the process fluid to the desired temperature.

As the ambient temperature increases in summer, the flow control mechanism 66 will increase the amount of process fluid entering the fluid circuit of the second indirect contact heat exchange section 28. At the summer peak temperature, that is, at the design peak temperature, all or substantially all of the process fluid will be directed through the fluid circuit 34 of the second indirect contact heat exchange section 28. At the peak load, the second indirect contact heat exchange section 28 carries the significant part of the heat load, and the dry indirect contact heat exchange section 16 acts as a supplementary heat exchanger to meet the design heat load. The thermal process at this stage departs significantly from the adiabatic saturation process. The evaporative liquid temperature is significantly higher than in Mode 2, and the temperature of the air stream 98 exiting the second indirect contact heat exchange section 28 is significantly higher than in Mode 2, but still low enough to enable the dry indirect contact heat exchange section 16 to perform useful cooling. In this mode, the direct contact heat exchange section 76 operates substantially as the fill sections in U.S. Pat. Nos. 5,435,382 and 5,724,828, and in the Series 1500 Closed Circuit Cooling Towers and Series 1500 Evaporative Condensers available from Baltimore Aircoil Company of Baltimore, Md., to cool the evaporative liquid.

The effects of operation in Mode 3 are illustrated in the temperature profiles of FIG. 2c. As there shown, the process fluid is cooled in the dry indirect contact heat exchange section 16 from an initial temperature $T_{fi}$ to a temperature $T_{f*}$ at the dry section outlet, but not to the extent as in the other modes of operation. The temperature of the process fluid at the outlet 14 may be at or near the outlet temperature from the dry indirect contact heat exchange section 16 if most of the process fluid bypasses the second indirect heat exchange section 28, as shown by the horizontal line in FIG. 2c and labeled "by-pass part". If all of the process fluid flows through the connecting path 60 and passes through the second indirect contact heat exchange section 28 to the outlet 14, the process fluid temperature at the outlet 14 will drop to the lower level shown in FIG. 2c and labeled "through coil". Operation of the flow control mechanism 66 to draw a mixture of process fluid from both heat exchange sections 16, 28 will result in an outlet temperature $T_{fo}$ that lies between the other outlet temperatures, as shown at "mix" in FIG. 2c for a mixture of 50% of the process fluid taken from the dry indirect contact heat exchange section 16 and 50% of the process fluid taken from the second indirect contact heat exchange section 28. It should be understood that the 50—50 mixture is given for purposes of illustration only; the actual relative percentages of fluids will vary depending upon the operation of the flow control mechanism 66, and the mix point will move up and down accordingly; for example, at the design peak load, it would be expected that 100% of the process fluid will enter the coil of the second indirect contact heat exchange section, and the process fluid outlet temperature will be at the lower point.

In the third mode of operation, the dry bulb temperature of the primary air stream 98 will decrease in the second indirect contact heat exchange section 28 from $T_{dbi}$ to $T_{dbo}$, as its wet bulb temperature increases from $T_{wbi}$ to $T_{wbo}$. The dry bulb temperature of the secondary air stream 96 will decrease in the direct contact heat exchange section 76 from $T_{dbi}$ to $T_{dbo}$, as its wet bulb temperature increases from $T_{wbi}$ to $T_{wbo}$. In this mode of operation, the outlet dry bulb and wet bulb temperatures of the secondary air stream 96 are closer to each other than those of the primary air stream, since the secondary air stream 98 is likely to be more saturated than the primary air stream 96. The two air streams 96, 98 mix in the plenum 84, as indicated by the words "mix" at the outlet temperatures, reaching a mix temperature between the outlet temperatures of the primary and secondary air streams. The combined air stream 110 is then passed through the dry indirect contact heat exchange section 16, and the wet and dry bulb temperatures of the air stream 110 increase as heat is extracted from the process fluid. In the second indirect and direct contact heat exchange sections 28, 76, the wet bulb temperatures of the air streams are the significant temperatures, as indicated by the solid lines in FIG. 2c, and the dry bulb temperatures are not as significant, as indicated by the dashed lines. In the dry indirect contact heat exchange section 16, the dry bulb temperature of the air stream 110 is the significant temperature, as indicated by the solid line, and the wet bulb temperature is less significant, as indicated by the dashed line.

In the third mode of operation, the temperature of the evaporative liquid in the second indirect contact heat exchange section 28 will increase from an initial temperature $T_{wi}$ between the air streams' wet bulb temperatures and the temperature of the process fluid discharged from the second indirect contact heat exchange section (shown in FIG. 2(c) at "through coil"). The initial temperature will increase to the temperature $T_{wo}$, as shown in FIG. 2c at the line labeled "recirculated evaporative liquid" and the arrow labeled 28. The warm evaporative liquid will then enter the direct contact heat exchange section 76, where it will be cooled from the temperature $T_{wo}$ to the temperature $T_{wi}$, as shown in FIG. 2c at the line labeled "recirculated evaporative liquid and the arrow labeled 76.

The water-saving advantages of the present invention can be seen by comparing FIGS. 3a and 3b. FIG. 3a illustrates use of the heat exchange system and methods of the present invention throughout a common year for a given location. For purposes of this illustration, the dry bulb and wet bulb temperature profiles for Stuttgart/Echterdingen AB, Germany are used. Temperature is plotted along the ordinate or Y-axis and the number of hours are plotted along the abscissa or X-axis. Thus, it can be seen that the dry bulb temperature for this location should be below 15° C. or 59° F. for 70.3% of the year during the spring, fall and winter. For about 17.7% of the year, the dry bulb temperature is above 15° C. or 59° F. but the wet bulb temperature is below 15° C. or 59° F. Both the dry bulb and wet bulb temperatures are above 15° C. or 59° F. for about 12% of the year. With the present invention, the heat exchange system may be operated in Mode 1 as a dry apparatus, with no evaporative liquid used, for 70.3% of the time. When the ambient dry bulb temperature is above 15° C. or 59° F. but the wet bulb temperature is below 15° C. or 59° F., the heat exchange system 8 may be operated in Mode 2, with adiabatic saturation and with minimal losses of evaporative liquid. When both the wet bulb and dry bulb ambient temperatures are above 15° C. or 59° F., the heat exchange system 8 and process may be operated in Mode 3. It should be understood that the particular cut-off temperatures for operation in the various modes are given for purposes of illustration only. The actual cut-offs for operation in the various modes may instead depend directly on the process fluid temperature or pressure demand downstream of the dry indirect contact heat exchange section 16, such as at the process fluid outlet 14. The cut-off process fluid temperatures or pressures should correlate with the ambient temperatures so that the usage periods for each of the modes of operation should follow the percentages illustrated in FIG. 3a. The actual percentage operable time of each mode of operation will depend on the particular annual temperature profile for the location and on the design cut off temperatures or pressures (such as air dry bulb temperature design cut offs) for which the heat exchange system was sized. The changes between each mode can be through automatic controls, as described above, or through a manual process, although the use of the modulating valve and the process fluid temperature sensor is preferred.

Potential evaporative liquid savings for a fluid cooler are graphically illustrated in FIG. 3b, assuming that the heat rejection load remains constant throughout the year. In a typical closed circuit evaporative cooling tower, evaporative liquid consumption is essentially independent of specific ambient weather conditions and is about 1.2 pounds of water per 1000 BTU's of heat rejected. This consumption is represented in FIG. 3b by the top horizontal dashed line. The water consumption for the present invention is represented in FIG. 3b by the lower solid line. For this particular example, use of the present invention could result in a saving of about 90% of the water that would be used in the conventional evaporative product. In general, the heat rejection load may not be constant throughout the year, but substantial water savings will still be achievable.

As can be seen in FIGS. 4–6, there are many possible variations in the structure of the heat exchange system 8 of the present invention. For example, as seen in FIG. 4, the heat exchange system need not have a direct contact evaporative heat exchange section 76 of the type shown in FIG. 1, and the air moving device 108 can comprise a forced draft propeller fan or any other type of fan. Thus, an existing counterflow forced draft indirect evaporative cooling tower can be retrofitted with relatively minor modifications to take advantage of the present invention. And as seen in FIGS. 5 and 6, two dry indirect contact heat exchange sections or devices 16 could be added to a heat exchange apparatus with dual coil assemblies 36 and dual direct contact heat exchange sections 76. Heat exchange apparatuses 10 with counterflow air and evaporative liquid streams in the direct contact heat exchange section 76, as in the FIG. 5 embodiment, and with cross-current air and evaporative liquid streams, as in the FIG. 6 embodiment, may be retrofitted with one or more dry indirect contact heat exchangers 16 along with appropriate valves 66, process fluid connecting flow paths 60, process fluid bypass flow paths 64, and process fluid outlet paths 62, along with appropriate sensors 70, 74 and a programmable logic element 72 if desired. Although the illustrated embodiments show concurrent evaporative liquid and air stream flow (FIGS. 1, 5 and 6) and counterflow for the evaporative liquid and air stream in the second indirect contact heat exchange sections 28 (FIG. 4), the invention may also be used with heat exchange systems 8 using a cross-flow of the air stream 98 through the evaporative liquid. Although FIGS. 5 and 6 illustrate only one of the dual dry and second indirect contact heat exchange sections connected to modulating valves 66 and to the process fluid flow paths 60, 64, it should be understood that the dual sections could be connected to run in series, in parallel, or separately. Also, as shown in FIGS. 5–6, the dry indirect contact heat exchange sections 16 may be positioned upstream of the air-moving device 108, rather than downstream as in the FIG. 1 embodiment. And although the embodiments illustrated in FIGS. 1 and 4–6 are examples of retrofitted closed circuit heat exchange apparatuses, it should be understood that other heat exchange apparatuses may be retrofitted, and that other arrangements of the components of the present invention may be made as part of original equipment. Unless expressly set forth in one of the claims, the invention is not intended to be limited to any particular arrangement of components, and is not limited to retrofitting of existing heat exchangers.

Any of the heat exchange systems may include standard structures, such as drift eliminators 114 to minimize or eliminate any water droplets exiting the air outlet. The drift eliminators 114 may comprise closely spaced metal, plastic or wood slats or louvers, which permit air flow therethrough but will collect the fine water droplets in the air. Other standard devices may also be used with the present invention.

In selecting components, the particular devices used for the dry indirect contact heat exchange section 16 and second indirect contact heat exchange section 28 may be selected based upon standard engineering design principles. The dry indirect contact heat exchange section 16 is sized to accomplish most of the thermal duty in the dry mode; in this mode, the second indirect contact heat exchange section 28, depending on its size, will add some 6–15% thermal capacity, for example, but the dominant heat exchanger will be the finned tubes 26 of the dry indirect contact heat exchange section 16. However, in the wet mode of operation, the second indirect contact heat exchange section 28 will do 60–70% of the thermal duty, and the finned coils 26 will do the remaining 40–30%. The actual thermal duty percentages for each section will depend on the relative size of both heat exchangers 16, 28. If the application calls for constant thermal duty over the course of an entire year, one would select a large dry indirect contact heat exchange section 16 and a relatively small second indirect contact heat exchange section 28. If the summer duty, and wet operation, is anticipated to be greater than the winter duty, and dry operation, then a larger second indirect contact heat exchange section 28 would be selected.

And while the effect of using the heat exchange systems and methods have been described for fluid cooling, it should be understood that the heat exchange systems and methods may also be used for other heat extraction operations, such as vapor condensing. For vapor condensing, the direction of flow of the process fluid may be varied from that described above, as described in U.S. Pat. Nos. 5,435,382 and 5,816, 318, and as described below with reference to FIGS. 11 and 12.

In FIGS. 11 and 12, like reference numbers have been used for parts like those described above for the embodiments of FIGS. 1 and 4–6. FIG. 11 illustrates a heat exchange system 8 used as a condenser, with parallel refrigerant flow through the dry indirect contact heat exchange section 16 and second indirect contact heat exchange section 28. FIG. 12 illustrates a heat exchange system 8 used as a condenser, with serial refrigerant flow through the dry indirect contact heat exchange section 16 and second indirect contact heat exchange section 28. In both the embodiments of FIGS. 11–12, the dry indirect heat exchange section 16 may comprise two heat exchange apparatuses of the type shown in FIG. 7 and described above, connected in parallel. As in the embodiments of FIGS. 1 and 5–6, the heat exchange systems of FIGS. 11 and 12 each include a direct contact heat exchange section 76. All of the heat exchange sections 16, 28, 76 of the condensers of FIGS. 11–12 have air inlet sides 18, 30, 78 and air outlet sides 20, 32, 80. The structures of the second indirect contact heat exchange section 28 may be the same for the FIGS. 11–12 embodiments as for those illustrated in FIGS. 1 and 4–6, such as those illustrated in FIGS. 8–10.

Figure 14:
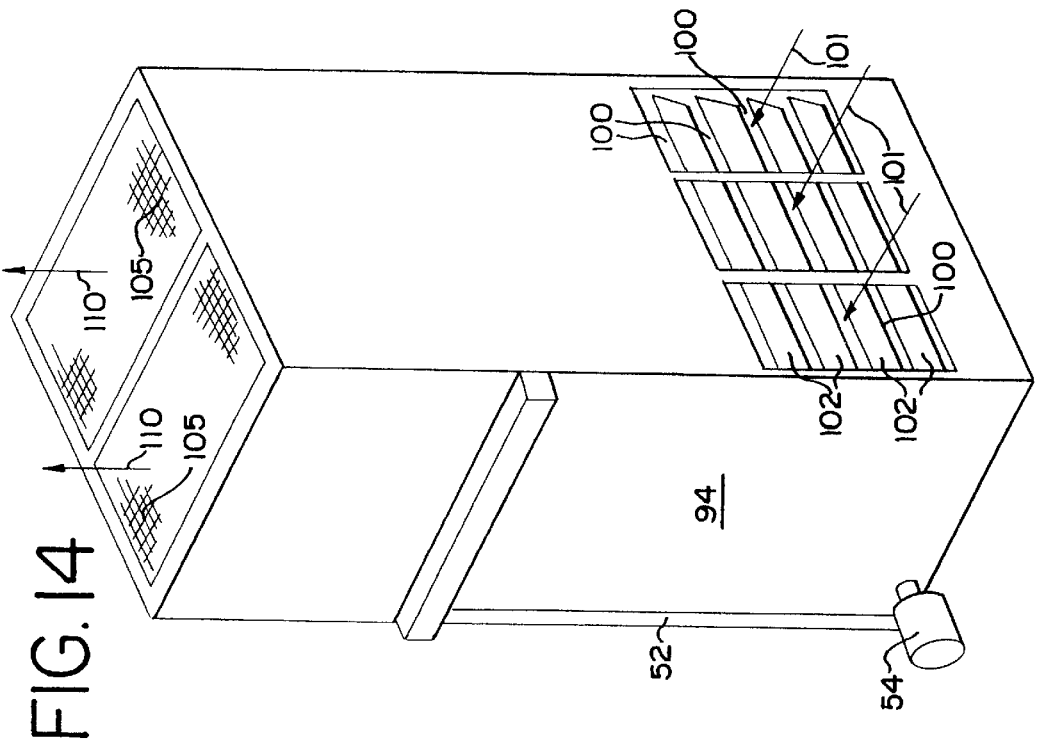
FIG. 14 is a schematic perspective view of another side of the exterior of the heat exchanger of FIG. 13, taken from an opposite corner of the heat exchanger.

As in the previous embodiments, the condensers of FIGS. 11 and 12 have housings 94 and plenums 84. The walls of the housings at the plenums have auxiliary air openings 100 and dampers 102 so that an auxiliary air stream 101 may enter the plenum and be moved to the air inlet side 18 of the dry indirect contact heat exchange section 16 without first passing through either the second indirect contact heat exchange section 28 or the direct contact heat exchange section 76. The auxiliary ambient air stream 101 may be mixed with the other air streams as described above into the common air stream 110. Dampers 102 may be provided for selectively closing the auxiliary air openings 100. The dampers 102 may be connected to one or more servo motors of any standard type, shown generally at 104 in FIGS. 11–12, and the motors 104 may be connected to a control mechanism which may be connected to the central logic element 72 or other control device so that the dampers may be automatically opened and closed depending on, for example, the temperature or pressure of the process fluid downstream of the dry indirect contact heat exchange section 16, or some other factor. Generally, for condensers, the dampers 102 should be closed when the heat exchange system is operating in the wet mode and open when the heat exchange system is operating in the dry mode. As in the embodiment of FIG. 1, the dampers 102 need not be motorized but could be manually operable as well, The outward appearance of the condensers of FIGS. 11–12 may be similar to that shown in FIGS. 13–14, with louvers 97 at the openings 95 into the interior of the housing. The housing may have wire screens 105 at the air stream exits from the dry indirect contact heat exchange section, as shown in FIGS. 13–14. The exterior piping would differ somewhat from that shown in FIG. 13 as well.

The condensers of FIGS. 11 and 12 may be operated in both a dry mode and wet mode. Preferably, the condensers are operated in a dry mode for as long a time as possible to minimize the use of the evaporative liquid and to thereby conserve evaporative liquid. The dry indirect contact heat exchange section 16 should be sized accordingly; it should have sufficient capacity to condense the process fluid during a substantial part of the year, without use of the second indirect heat exchange section 28 in the wet or evaporative mode.

The motorized fan 108 of the condensers of FIGS. 11 and 12 is preferably either a two-speed motorized fan or a variable speed motorized fan. In either case, at the design ambient dry bulb temperature, the fans 108 will operate at full speed, and the condenser will operate in the dry mode. If dampers 102 are provided, they are fully open to maximize air flow through the dry indirect contact heat exchange section 16. At lower dry bulb temperatures, the fan speed is decreased and the dampers are closed. In the wet operation mode, the pump 54 is activated so that evaporative liquid is moved upward through the pipe 52 to the distribution pipe system 50 and spray nozzles 48, and distributed over the second indirect heat exchange section 28. At the design wet bulb temperature, the fan 108 operates at full speed, and the dampers 102 are closed to maximize air flow through the second indirect heat exchange section 28 and the direct contact heat exchange section 76. As the wet bulb temperatures decrease below the design level, the speed of the fan 108 may be decreased.

In the parallel flow condenser of FIG. 11, the illustrated embodiment uses a plurality of supply flow paths and a plurality of valves in various flow paths. A first process fluid supply flow path 200 leads from the process fluid inlet 12 to the top inlet 24 of the dry indirect contact heat exchange section. After the process fluid has flowed through the process fluid circuits 34, the process fluid flows to the bottom outlet 25 and to a first process fluid outlet flow path 202 leading from the dry indirect contact heat exchange section 16 to the process fluid outlet 14. The first process fluid outlet flow path 202 includes a connecting conduit 204, a common conduit 206 and a common receiver 208. The connecting conduit 204 leads from the dry indirect contact heat exchange section 16 to the common receiver 208. The common receiver 208 comprises a tank. The tank may be made of metal or other suitable material. The common conduit 206 has one end within the common receiver 208, near a low level, and another end outside of the common receiver 208. There is a first control valve 210 in the line of the connecting conduit 204. There is also a check valve 212 in the line of the connecting conduit 204 to prevent higher pressure process fluid in the common receiver 208 from backing up into the connecting conduit to the condenser 16, which could otherwise occur at low ambient air temperatures.

In the FIG. 11 embodiment, a second supply flow path 214 leads from the process fluid inlet 12 to the top fluid header 40 of the second indirect contact heat exchange section 28. After the process fluid flows through the process fluid circuit 34, the process fluid enters the bottom fluid header 42 and flows to a second process fluid outlet flow path 216 leading from the second indirect contact heat exchange section 28 to the process fluid outlet 14. The second process fluid outlet flow path 216 includes a connecting conduit 218, the common conduit 206 and the common receiver 208. The connecting conduit 218 leads from the second indirect contact heat exchange section 28 to the common receiver 208. There is a second valve 220 in the line of the second connecting conduit 218. There is also a check control valve 222 in the line of the connecting conduit 218 to prevent higher pressure process fluid in the common receiver 208 from backing up into the connecting conduit to the condenser 28, which could otherwise occur at low ambient air temperatures.

There is a third process fluid supply path 224 leading from the process fluid inlet 12 to the common receiver 208. A third control valve 226 is in the third process fluid supply path 224.

The three control valves 210, 220, 226 provide mechanisms to control the flow of process fluid so that the process fluid exiting the process fluid outlet 14 may be selectively drawn from the dry indirect contact heat exchange section 16 and the second indirect contact heat exchange section 28. These control valves provide this selectivity by allowing for control of the fluid entering the common receiver 208: if control valve 210 is open, but control valve 220 is closed, the process fluid in the common receiver 208 will include fluid that has passed through the dry indirect contact heat exchange section 16. If the heat exchanger operates in this mode for a substantial length of time, the process fluid drawn off from the common receiver 208 through the common conduit 206 to the expansion valve will consist substantially of process fluid that has passed through the dry indirect contact heat exchange section 16 but not the second indirect contact heat exchange section 28. If both control valves 210 and 220 are open, the process fluid in the common receiver 208 will comprise a mixture of fluids that have passed through the two indirect contact heat exchange sections 16, 28, and the process fluid drawn off through the common conduit 206 will comprise a mixture. If the third control valve is 226 open but the other control valves 210, 220 are closed, then the process fluid in the common receiver 208 will include fluid that has not passed through either indirect contact heat exchange section 16, 28.

The three control valves 210, 220, 226 can be set to open and close automatically. The control valves could be connected to a controller such as a programmable logic element shown at 72 in FIGS. 11–12, which may be part of the overall plant computerized control system, part of the heat exchange apparatus 10 or part of a stand alone computer. The programmable control element 72 could receive input from a temperature sensor, shown at 74 in FIGS. 11–12. Appropriate servo mechanisms could be connected to the controller 72 and to the valves 210, 220, 226 so that the valves are opened and closed based upon ambient temperature. For example, the valve 226 could be set to be open only at some minimum ambient temperature range, below 40° F. for example, with the valves 210 and 220 closed at this temperature. When the ambient temperature rises to about 50° F., for example, the valve 226 may close, valve 210 open, and valve 220 remain closed so that the system uses only the dry indirect contact heat exchange section 28 to extract heat from the process fluid. As the ambient temperature begins to rise above another set point, such as 70° F., the valve 220 may begin to open to allow some process fluid to flow to the second indirect contact heat exchange section 220. At a set ambient temperature of about 80° F., both valves 210 and 220 may be fully open so that both the dry and second indirect contact heat exchange sections 16, 28 are fully operable.

Preferably, the control valves 210, 220, 226 are pressure valves that sense the condensing pressure of the process fluid in each line and open and close based upon the sensed pressure and an individual set point pressure set for each control valve. Thus, control valve 210 leading from the dry indirect contact heat exchange section 16 is preferably set to a minimum operational condensing pressure that corresponds with a minimum condensing temperature for the process fluid. As long as the process fluid pressure upstream of the valve 210 exceeds this minimum set point, control valve 210 remains open and process fluid flows from the dry indirect contact heat exchange section 16 to the common receiver 208. Operation in this mode is preferably for a majority of the time, and the dry indirect heat exchange section 16 should be sized accordingly.

The second control valve 220 can be set to open at a higher pressure, corresponding with a higher condensing pressure and temperature for the process fluid. If the pressure of the process fluid in the flow path 214 upstream of the valve 220 reaches or exceeds the set point for the second control valve 220, the second control valve 220 opens. With both the first and second control valves 210, 220 open, the process fluid flows through both the dry and second indirect contact heat exchange sections and both streams of process fluid flow into the common receiver 208. The second indirect contact heat exchange section 28 may operate in either a dry or evaporative mode. The heat exchange system could also be set so that the valve 220 opens at one temperature to operate in a dry mode, with the pump 54 being activated at another higher temperature to operate in the evaporative mode.

The third control valve 226 is set to open at a pressure lower than the set points for the first and second control valves 210, 220. Thus, if the process fluid pressure is low, such as at low ambient temperatures and during the system start up, the third control valve 226 is open and the first and second control valves 210, 220 are closed. The process fluid will flow directly to the common receiver 208 without passing through either indirect heat exchange section 16, 28 to quickly pressurize the common receiver 208.

Commercially available valves may be used for the control valves 210, 220, 226. An example of a suitable commercially available valve is a regulating valve such as the Type A4A Liquid Drain Regulator from Refrigerating Specialties Company of Broadview, Ill.

Water conservation may be achieved in the FIG. 11 embodiment by tying use of the evaporative liquid to the ambient dry bulb temperature, for example. The temperature sensor 74 may be tied to the controller 72, which turns the water pump 54 on when the ambient dry bulb temperature exceeds the set point. The dampers 102 may also be closed when this set ambient dry bulb temperature is reached.

It may be desirable to activate the distribution system 46 while valve 220 is closed to cool the air streams 96, 98 before they enter the dry indirect contact heat exchange section 16. In this mode, the evaporative liquid would not carry any heat load from the process fluid.

In the serial flow condenser of FIG. 12, the process fluid, a refrigerant vapor, enters the process fluid inlet 12 and flows to the dry indirect contact heat exchange section 16 where heat is partially extracted. The process fluid then comprises a mixture of refrigerant vapor and liquid which flows through the connecting path 60 to the second indirect contact heat exchange section 28 where the remaining refrigerant vapor condenses to a liquid. During dry mode operation, the heat extraction process is controlled by the amount of air passing through the dry and second indirect contact heat exchange sections 16, 28. At the design dry-bulb cut off temperature in the dry mode, the air flow is provided at its maximum rate.

As the air temperature drops below the design cut off point, the condensing pressure in the liquid discharge line 62 decreases, as well as its condensing temperature. This change is sensed by a sensor 70, which may be either a temperature or pressure sensor, in the discharge line 62 from the second indirect contact heat exchange section 28. The sensor 70 is connected to provide input to the controller 72. When the controller 72 receives the signal from the sensor 70 that the condensing pressure or condensing temperature of the process fluid has decreased, the controller 72 sends a signal to slow the speed of the fan 108. For a two-speed fan, the speed is changed from high to low; for a variable speed fan, the motor speed is changed gradually from the higher to a lower speed.

As the ambient air temperature rises above the design cut off point, the condensing pressure in the liquid discharge line 62 decreases, as well as its condensing temperature. This change may be sensed either by the sensor 74, if ambient temperature is used, or the sensor 70, if the condensing pressure is used, and an appropriate signal is sent to the controller 72. The controller responds by turning on the pump 54. Thus, the evaporative liquid will be pumped up to the nozzles 48 and sprayed over the second indirect heat exchange section 28 for evaporative condensing. The controller 72 may also regulate air flow by running the fan 108 at low speed at air temperatures below the maximum, and by increasing the fan speed as the summer peak temperature is approached.

Design variations are possible. For example, the air dampers 102 could be combined with the variable or two speed fan. The air dampers 102 for modulating air flow could also be used with constant speed fans. It may be desirable to include a by pass flow path as in the fluid coolers of FIGS. 1 and 4–6 in the FIG. 12 design as well, or a connecting flow path in the FIG. 11 design.

The present invention also provides methods of extracting heat from process fluids. In one aspect, a process fluid is passed through the heat exchange system 8 while an air stream is moved through the heat exchange system 8. The heat exchange system includes a dry indirect contact heat exchange section 16, a second indirect contact heat exchange section 28, a direct contact heat exchange section 76, and an evaporative liquid distribution system 46 over the second indirect contact heat exchange section. The evaporative liquid is selectively distributed or not distributed to the second indirect contact heat exchange section 28. The alternative of distributing or not distributing the evaporative liquid may be based upon a physical property of the process fluid such as pressure or temperature, in which case the method would include the step of measuring a physical property of the process fluid. The alternative of distributing or not distributing the evaporative liquid could alternatively be based upon the ambient temperature, in which case the method would include the step of measuring the ambient air temperature.

The process fluid temperature or pressure may be measured at a location downstream of the dry indirect contact heat exchange section 16, such as at the process fluid outlet 14.

In another aspect, the method of the present invention provides a method of extracting heat from a process fluid comprising the steps of providing a process fluid, providing an evaporative liquid and providing a heat exchange system 8. The heat exchange system 8 includes a distribution system 46 for the evaporative liquid, a dry indirect contact heat exchange section 16, a second indirect contact heat exchange section 28 and a direct contact heat exchange section 76. The method includes the step of moving an air stream through the second indirect contact heat exchange section 28 while distributing the evaporative liquid over the second indirect contact heating section 28 to cool the air stream to a temperature below the ambient dry bulb temperature. The cooled air stream is moved through the dry indirect contact heat exchange section 16 while passing the process fluid through the dry indirect contact heat exchange section 16.

Thus, with the heat exchange system and methods of the present invention, evaporative liquid and energy may both be conserved. In addition, since any air stream discharged from heat exchange apparatus passes through the dry indirect contact heat exchange section immediately before being discharged, the discharge air stream is heated to reduce or eliminate plume formation.

While only specific embodiments of the invention have been described and shown, it is apparent that various additions and modifications can be made thereto, and that substitutions may be made for various elements of the invention. It is therefore the intention in the appended claims to cover all such additions, modifications and substitutions as may fall within the true scope of the invention.

We claim:

1. A heat exchange system for extracting heat from a process fluid comprising:
   a housing;
   a plenum in the housing;
   a process fluid inlet;
   a process fluid outlet;
   a dry indirect contact heat exchange section having an air inlet side positioned to receive air from the plenum, an air outlet side and a process fluid circuit connected to receive process fluid from the process fluid inlet;
   a second indirect contact heat exchange section including an air inlet side and an air outlet side positioned for an air stream to pass to the plenum, and a process fluid circuit connected to receive process fluid;
   a process fluid outlet flow path from the second indirect contact heat exchange section to the process fluid outlet;
   a direct contact heat exchange section having fill media, an air inlet side and an air outlet side positioned for an air stream to pass to the plenum;
   a device for creating currents of air moving in parallel through the second indirect contact heat exchange section and through the direct contact heat exchange section and into the plenum and a single current of air moving from the plenum into the air inlet side of the dry indirect contact heat exchange section; and
   a distribution system for selectively distributing an evaporative liquid to said second indirect contact heat exchange section.

2. The heat exchange system of claim 1 wherein the housing includes an auxiliary opening into the plenum so that some ambient air may be drawn directly into the plenum without first passing through the second indirect contact heat exchange section or the direct contact heat exchange section and a damper for selectively closing the auxiliary opening.

3. A heat exchange system for extracting heat from a process fluid comprising:
   a process fluid inlet;
   a process fluid outlet;
   a dry indirect contact heat exchange section having an air inlet side, an air outlet side, and a process fluid circuit receiving process fluid from the process fluid inlet;
   a second indirect contact heat exchange section including an air inlet side, an air outlet side and a process fluid circuit;
   a process fluid connecting flow path from the dry indirect contact heat exchange section process fluid circuit to the second indirect contact heat exchange section process fluid circuit;
   a process fluid outlet flow path from the second indirect contact heat exchange section to the process fluid outlet;
   a mechanism for controlling the flow of process fluid so that the process fluid exiting the process fluid outlet may be selectively drawn from the dry indirect contact heat exchange section and the second indirect contact heat exchange section; and
   a distribution system for selectively distributing an evaporative liquid to the second indirect contact heat exchange section.

4. The heat exchange system of claim 3 further comprising a process fluid bypass flow path from the dry indirect contact heat exchange section process fluid circuit to the process fluid outlet.

5. The heat exchange system of claim 3 further comprising a direct contact heat exchange section having an air inlet side, an air outlet side and fill media.

6. The heat exchange system of claim 3 wherein the mechanism for controlling the flow of process fluid allows for process fluid to be drawn and mixed from both the dry indirect contact heat exchange section and second indirect contact heat exchange section simultaneously.

7. The heat exchange system of claim 3 wherein the direct contact heat exchange section is positioned to receive evaporative liquid from the second indirect contact heat exchange section, the heat exchange system further including a sump to receive evaporative liquid from the direct contact heat exchange section, and wherein the distribution system includes a plurality of spray outlets and a mechanism for selectively moving the evaporative liquid from the sump to the spray outlets.

8. The heat exchange system of claim 7 wherein the dry indirect contact heat exchange section air inlet side is downstream from the direct contact heat exchange section air outlet side and the second indirect contact heat exchange section air outlet side so that an air stream entering the dry indirect contact heat exchange section air inlet side may be selectively adiabatically saturated before entering the dry indirect contact heat section air inlet side.

9. The heat exchange system of claim 3 wherein the dry indirect contact heat exchange section fluid circuit includes a finned tube.

10. The heat exchange system of claim 3 wherein the mechanism for controlling the flow of process fluid comprises a modulating valve.

11. The heat exchange system of claim 10 wherein the modulating valve allows for control of the flow of process fluid so that the process fluid either enters the second indirect contact heat exchange section, completely bypasses the second indirect contact heat exchange section or partially bypasses the second indirect contact heat exchange section.

12. The heat exchange system of claim 10 wherein the modulating valve comprises a servo valve, the heat exchange system further comprising a temperature sensor mechanism connected to determine the temperature of the process fluid downstream of the dry indirect contact heat exchange section process fluid circuit and second indirect contact heat exchange section process fluid circuit and to control the operation of the servo valve in response to the sensed temperature of the process fluid.

13. The heat exchange system of claim 5 further comprising a common plenum between the dry indirect contact heat exchange section air inlet side and the air outlet sides of the second indirect heat exchange section and the direct contact heat exchange section.

14. The heat exchange system of claim 13 further comprising a housing substantially surrounding the direct contact heat exchange section and plenum, the housing having an opening corresponding with the direct contact heat exchange section air inlet side, an auxiliary air opening into the plenum upstream of the direct contact heat exchange section air outlet, and dampers for selectively closing the auxiliary air opening.

15. The heat exchange system of claim 5 further comprising a mechanism for moving ambient air into the second indirect contact heat exchange section, ambient air into the direct contact heat exchange section and for moving air from the air outlet sides of the second indirect contact heat exchange section and direct contact heat exchange section into the dry indirect contact heat exchange section air inlet side, through the dry indirect contact heat exchange section and out the air outlet side of the dry indirect contact heat exchange section.

16. The heat exchange system of claim 15 wherein the air-moving mechanism comprises a variable speed fan, the heat exchange system further comprising a temperature sensor for determining the temperature of the process fluid and a control mechanism for varying the speed of the fan based upon the process fluid temperature.

17. The heat exchange system of claim 3 further comprising a temperature sensor connected for determining the temperature of the process fluid downstream of the flow control mechanism.

18. The heat exchange system of claim 17 wherein the distribution system includes a mechanism for moving the evaporative liquid and a controller connected to the temperature sensor and moving mechanism so that the evaporative liquid can be distributed or not distributed based on the temperature of the process fluid downstream of the dry indirect contact heat exchange section.

19. The heat exchange system of claim 18 wherein the mechanism for moving the evaporative liquid comprises a pump.

20. The heat exchange system of claim 1 wherein the air inlet side of the second indirect contact heat exchange section is positioned to receive ambient air and the air inlet side of the direct contact heat exchange section is positioned to receive ambient air.

21. The heat exchange system of claim 3 wherein the heat exchange system has no flow path that would allow the process fluid to enter the distribution system for selectively distributing an evaporative liquid to the second indirect contact heat exchange section.

22. The heat exchange system of claim 21 wherein the heat exchange system has no flow path that would allow evaporative liquid to enter the process fluid circuit of the dry indirect contact heat exchange section.

23. The heat exchange system of claim 3 wherein the mechanism for controlling the flow of process fluid allows for substantially all of the process fluid to be drawn from the dry indirect contact heat exchange section without the process fluid having passed through the second indirect contact heat exchange section.

24. A heat exchange system for extracting heat from a process fluid comprising:
   a process fluid inlet;
   a process fluid outlet;
   a dry indirect contact heat exchange section having an air inlet side, an air outlet side, and a process fluid circuit receiving process fluid from the process fluid inlet;
   a second indirect contact heat exchange section including an air inlet side, an air outlet side and a process fluid circuit;
   a process fluid flow path from the dry indirect contact heat exchange section to the process fluid outlet;
   a process fluid flow path from the second indirect contact heat exchange section to the process fluid outlet;
   a mechanism for controlling the flow of process fluid so that the process fluid exiting the process fluid outlet may be selectively drawn from the dry indirect contact heat exchange section and the second indirect contact heat exchange section; and
   a distribution system for selectively distributing an evaporative liquid to the second indirect contact heat exchange section.

25. The heat exchange system of claim 24 wherein the process fluid flow path leading from the dry indirect contact heat exchange section to the process fluid outlet comprises an outlet flow path and includes a connecting conduit, a common conduit and a common receiver, the connecting conduit leading from the dry indirect contact heat exchange section process fluid circuit to the receiver and the common conduit leading from the receiver to the process fluid outlet, and wherein the process fluid flow path leading from the second indirect contact heat exchange section to the process fluid outlet comprises an outlet flow path and includes a connecting conduit, the common receiver and the common conduit, the connecting conduit leading from the second indirect contact heat exchange section process fluid circuit to the common receiver, so that the process fluid exiting the dry indirect contact heat exchange section and the process fluid exiting the second indirect contact heat exchange section can mix in the common receiver and so that the mixture can be drawn out of the common receiver through the common conduit.

26. The heat exchange system of claim 25 wherein the flow control mechanism comprises a plurality of pressure valves, one pressure valve downstream of the dry indirect contact heat exchange section and one pressure valve upstream of the second indirect contact heat exchange section, so that the process fluid drawn from the common receiver may comprise process fluid that has passed through the dry indirect contact heat exchange section, process fluid that has passed through the second indirect contact heat exchange section, and mixtures thereof.

27. The heat exchange system of claim 26 wherein the system includes a bypass flow path from the process fluid inlet to the common receiver, and wherein the pressure valves include a third valve in the bypass flow path so that the process fluid drawn from the common receiver may include process fluid that has bypassed the dry and second indirect contact heat exchange sections.

28. The heat exchange system of claim 24 further comprising a direct contact heat exchange section having an air inlet side, an air outlet side and fill media.

29. The heat exchange system of claim 28 further comprising a common plenum between the dry indirect contact heat exchange section air inlet side and the air outlet sides of the second indirect contact heat exchange section and the direct contact heat exchange section.

30. The heat exchange system of claim 29 further comprising a housing substantially surrounding the direct contact heat exchange section and the plenum, the housing having an opening corresponding with the direct contact heat exchange section air inlet side, an auxiliary air opening into the plenum upstream of the direct contact heat exchange section air outlet, and dampers for selectively closing the auxiliary air opening.

31. The heat exchange system of claim 28 further comprising a mechanism for moving ambient air into the second indirect contact heat exchange section, ambient air into the direct contact heat exchange section and for moving air for the air outlet sides of the second indirect contact heat exchange section and direct contact heat exchange section into the dry indirect contact heat exchange section air inlet side, through the dry indirect contact heat exchange section and out the air outlet side of the dry indirect contact heat exchange section.

32. The heat exchange system of claim 31 wherein the air-moving mechanism comprises a variable speed fan, the heat exchange system further comprising a temperature sensor for determining the temperature of the ambient air and a control mechanism for varying the speed of the fan based upon the ambient temperature.

33. The heat exchange system of claim 24 further comprising a temperature sensor for determining the temperature of the ambient air.

34. The heat exchange system of claim 33 wherein the distribution system includes a mechanism for controlling the flow of evaporative liquid so that the evaporative liquid can be selectively distributed based upon the temperature of the ambient air.

35. The heat exchange system of claim 24 wherein the process fluid flow path leading from the dry indirect contact heat exchange section to the process fluid outlet comprises a bypass flow path from the dry indirect contact heat exchange section fluid circuit to the process fluid outlet, the system further comprising a connecting flow path from the dry indirect contact heat exchange section to the second indirect contact heat exchange section process fluid circuit.

36. The heat exchange system of claim 35 wherein the flow control mechanism allows for process fluid to be drawn and mixed from both the dry indirect contact heat exchange section and second indirect contact heat exchange section.

37. The heat exchange system of claim 36 wherein the flow control mechanism comprises a modulating valve.

38. The heat exchange system of claim 24 wherein the heat exchange system has no flow path that would allow the process fluid to enter the distribution system for selectively distributing an evaporative liquid to the second indirect contact heat exchange section.

39. The heat exchange system of claim 23 wherein the heat exchange system has no flow path that would allow evaporative liquid to enter the process fluid circuit of the dry indirect contact heat exchange section.

40. The heat exchange system of claim 24 wherein the mechanism for controlling the flow of process fluid allows for substantially all of the process fluid to be drawn from the dry indirect contact heat exchange section without the process fluid having passed through the second indirect contact heat exchange section.

41. A method of extracting heat from a process fluid comprising the steps of:
providing a process fluid;
providing an evaporative liquid;
providing a distribution system for the evaporative liquid, a dry indirect contact heat exchange section, a second indirect contact heat exchange section and a direct contact heat exchange section;
the direct contact heat exchange section including a fill material;
passing the process fluid through the second indirect contact heat exchange section while moving an air stream through the second indirect contact heat exchange section;
selectively distributing or not distributing the evaporative liquid over the second indirect contact heat exchange section; and
passing the evaporative liquid distributed over the second indirect contact heat exchange section through the direct contact heat exchange section.

42. The method of claim 41 further including the step of measuring a physical property of the process fluid and wherein the step of selectively distributing or not distributing the evaporative liquid over the second indirect contact heat exchange section is based upon the measured physical property of the process fluid.

43. The method of claim 42 wherein the physical property measured is the temperature of the process fluid.

44. The method of claim 41 further including the step of measuring the ambient air temperature and wherein the step of selectively distributing or not distributing the evaporative liquid over the second indirect contact heat exchange section is based upon the ambient air temperature.

45. A method of extracting heat from a process fluid comprising the steps of:
providing a process fluid;
providing an evaporative liquid;
providing a distribution system for the evaporative liquid, a dry indirect contact heat exchange section, a second indirect contact heat exchange section and a direct contact heat exchange section;
the second indirect contact heat exchange section having an air inlet side and an air outlet side, the air inlet side being positioned to admit ambient air into the second indirect contact heat exchange section;
the direct contact heat exchange section having an air inlet side and an air outlet side, the air inlet side being positioned to admit ambient air into the direct contact heat exchange section;

moving an air stream through at least one of the second indirect contact heat exchange section and the direct contact heat exchange section while distributing the evaporative liquid over that heat exchange section to cool the air stream to a temperature below the ambient dry bulb temperature; and moving the cooled air stream through the dry indirect contact heat exchange section while passing the process fluid through the dry indirect contact heat exchange section.

* * * * *